US010693880B2

(12) United States Patent
Kurian et al.

(10) Patent No.: US 10,693,880 B2
(45) Date of Patent: Jun. 23, 2020

(54) MULTI-STAGE AUTHENTICATION OF AN ELECTRONIC COMMUNICATION

(71) Applicant: Bank of America Corporation, Charlotte, NC (US)

(72) Inventors: Manu Kurian, Dallas, TX (US); Joseph Castinado, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 147 days.

(21) Appl. No.: 15/822,460

(22) Filed: Nov. 27, 2017

(65) Prior Publication Data

US 2019/0166128 A1 May 30, 2019

(51) Int. Cl.
*H04L 29/06* (2006.01)
*H04L 12/58* (2006.01)
*H04M 3/42* (2006.01)
*G06F 21/56* (2013.01)

(52) U.S. Cl.
CPC ............ *H04L 63/101* (2013.01); *H04L 51/12* (2013.01); *H04L 63/08* (2013.01); *H04L 63/0838* (2013.01); *H04L 63/0853* (2013.01); *H04L 63/0861* (2013.01); *H04L 63/12* (2013.01); *H04L 63/145* (2013.01); *G06F 21/566* (2013.01); *H04M 3/42068* (2013.01)

(58) Field of Classification Search
CPC ... G06Q 10/107; G06F 21/554; G06F 21/566; H04M 3/42068
USPC ....................................................... 726/18, 7
See application file for complete search history.

(56) References Cited

U.S. PATENT DOCUMENTS

| | | | |
|---|---|---|---|
| 7,249,175 B1 * | 7/2007 | Donaldson | G06Q 10/107 709/206 |
| 7,266,840 B2 | 9/2007 | Gruber | |
| 7,422,115 B2 | 9/2008 | Zager et al. | |
| 7,487,213 B2 | 2/2009 | Zager et al. | |
| 8,145,718 B1 | 3/2012 | Kacker et al. | |
| 8,484,456 B2 | 7/2013 | Low et al. | |
| 8,489,877 B2 | 7/2013 | Ivanov et al. | |
| 8,752,172 B1 | 6/2014 | Dotan et al. | |
| 9,053,304 B2 | 6/2015 | Ronda et al. | |
| 9,100,822 B2 | 8/2015 | Doss et al. | |
| 9,374,369 B2 | 6/2016 | Mahaffey et al. | |
| 9,531,714 B2 | 12/2016 | Innes et al. | |

(Continued)

OTHER PUBLICATIONS

"Anti-spam Techniques," https://en.wikipedia.org/wiki/Anti-spam_techniques, Retrieved on Sep. 28, 2017.

(Continued)

*Primary Examiner* — Bryan F Wright
(74) *Attorney, Agent, or Firm* — Weiss & Arons LLP; Michael A. Springs, Esq.

(57) ABSTRACT

Systems, methods and apparatus for authenticating and verifying an electronic communication are provided. Systems, apparatus and methods determine which emails pose a threat and which are benign. Systems, apparatus and methods filter malicious emails from non-malicious emails. Systems, apparatus and methods prevent receipt of bulk unsolicited and/or otherwise undesirable communications. Systems, apparatus and methods authenticate an identity of a sender of an electronic communication. Systems, methods and apparatus may involve biometric authentication.

9 Claims, 11 Drawing Sheets

(56) References Cited

U.S. PATENT DOCUMENTS

| | | | |
|---|---|---|---|
| 9,661,021 B2 | 5/2017 | Benson | |
| 9,736,149 B2 | 8/2017 | Bettenburg et al. | |
| 9,741,265 B2 | 8/2017 | Bhatnagar et al. | |
| 9,992,330 B1* | 6/2018 | Hodge | H04M 3/42068 |
| 10,009,358 B1* | 6/2018 | Xie | G06F 21/316 |
| 2011/0047618 A1* | 2/2011 | Evans | G06F 21/566 726/23 |
| 2012/0039452 A1* | 2/2012 | Horn | H04L 63/083 379/188 |
| 2013/0254036 A1 | 9/2013 | Trinh et al. | |
| 2013/0276106 A1* | 10/2013 | Barton | G06F 21/56 726/22 |
| 2013/0276120 A1* | 10/2013 | Dalcher | G06F 21/554 726/24 |

OTHER PUBLICATIONS

Dachuan Liu, Bo Dong, Xing Gao and Haining Wang, "Exploiting Eye Tracking for Smartphone Authentication," Retrieved on Nov. 1, 2017.
"Behavioral Biometrics," https://www.vasco.com/products/application-security/behavioral-authentication.html, Retrieved on Nov. 1, 2017.
"Communication Protocol," https://en.wikipedia.org/wiki/Communication_protocol, Retrieved on Sep. 26, 2018.
"Digital Identity," https://en.wikipedia.org/wiki/Digital_identity, Retrieved on Sep. 28, 2017.
"Email," https://en.wikipedia.org/wiki/Email, Retrieved on Sep. 26, 2018.
"Email Attachment," https://en.wikipedia.org/wiki/Email_attachment, Retrieved on Sep. 26, 2018.
"Email Authentication," https://en.wikipedia.org/wiki/Email_authentication, Retrieved on Sep. 26, 2018.
"Graphical User Interface," https://en.wikipedia.org/wiki/Graphical_user_interface, Retrieved on Oct. 24, 2017.
"Guide to Identifying Personally Identifiable Information," http://technology.pitt.edu/help-desk/how-to-documents/guide-identifying-personally-identifiable-information-pii, Retrieved on Oct. 20, 2017.
"Identity Theft," https://en.wikipedia.org/wiki/Identity_theft, Retrieved on Oct. 24, 2017.
"Identity Theft," https://www.justice.gov/criminal-fraud/identity-theft/identity-theft-and-identity-fraud, Retrieved on Oct. 24, 2017.
"Keystroke Dynamics," https://en.wikipedia.org/wiki/Keystroke_dynamics, Retrieved on Nov. 1, 2017.
"Malware," https://en.wikipedia.org/wiki/Malware, Retrieved on Sep. 26, 2017.
"Message Transfer Agent," https://en.wikipedia.org/wiki/Message_transfer_agent, Retrieved on Sep. 26, 2017.
Alex Perala, "New Microsoft Keyboard Has FPC Fingerprint Sensor Embedded in a Key," https://mobileidworld.com/microsoft-keyboard-fpc-sensor-key-006161/, Jun. 16, 2017.
"Personally Identifiable Information," https://en.wikipedia.org/wiki/Personally_identifiable_information, Retrieved on Oct. 20, 2017.
"Phishing," https://en.wikipedia.org/wiki/Phishing, Retrieved on Sep. 28, 2017.
"Post Office Protocol," https://en.wikipedia.org/wiki/Post_Office_Protocol, Retrieved on Sep. 26, 2017.
"Public-Key Cryptography," https://en.wikipedia.org/wiki/Public-key_cryptography, Retrieved on Sep. 28, 2017.
Simple Mail Transfer Protocol, https://en.wikipedia.org/wiki/Simple_Mail_Transfer_Protocol, Retrieved on Sep. 26, 2017.
"SMTP Authentication," https://en.wikipedia.org/wiki/SMTP_Authentication, Retrieved on Sep. 26, 2017.
"SMTP-Transfer-Model," https://en.wikipedia.org/wiki/File:SMTP-transfer-model.svg, Retrieved on Sep. 26, 2017.
"Spamming," https://en.wikipedia.org/wiki/Spamming, Retrieved on Sep. 28, 2017.
Josef Kittler, Mark S. Nixon, "Audio and Video Based Biometric Person Authentication," pp. 153, 250, 144, 360, 513, Jun. 2003.
Horst Bunke, Abraham Kandel, Mark Last, "Applied Pattern Recognition," pp. 25-27, Feb. 28, 2008.

* cited by examiner

MULTI-STAGE AUTHENTICATION OF AN ELECTRONIC COMMUNICATION

FIELD OF TECHNOLOGY

This disclosure relates to secure communication systems. In particular, the disclosure relates to using electronic authentication to prevent malicious communications from reaching intended recipients.

BACKGROUND

The cost of sending unsolicited bulk email, or "spam", to a recipient is generally so low that, by 2003, up to 30% of total email traffic was spam. (see *Growth of Spam Email*. visionedgemarketing.com. Retrieved 13 Jun. 2017). The prevalence of spam can undermine the practicality of email as an effective business or personal tool. While government legislation, such as the U.S. CAN-SPAM Act of 2003, and other anti-spam techniques have had some impact in mitigating the adverse effects of spam, the volume of spam sent is still very high and increasingly consists not only of advertisements, but often includes malicious links or content, such as malware. (see *Spam and phishing in Q1 2016*, May 12, 2016, securelist.com).

Malware, including viruses, worms, trojans, ransomware, spyware, adware and other malicious software is becoming an increasingly costly part of doing business using computer networks. Cybercrime damage is predicted to grow from three trillion dollars in costs in 2015 to six trillion dollars annually by 2021 (see, e.g., CSO Security Business Report, Jun. 15, 2017). Panda Labs™ reported capturing eighteen million new malware samples in the third quarter of 2016 alone, for an average of 200,000 new malware samples a day. According to a report from the Federal Bureau of Investigation (June 2016), about 4,000 ransomware attacks occurred per day in 2016. Kaspersky™ reported a rise in ransomware attacks between January of 2016 to September 2016 from once every two minutes to once every 40 seconds. Phishing emails including ransomware grew by over 97% during the third quarter of 2016 (PhishMe™ 2016 Q3 Malware Review). As such, the importance of associates of an enterprise understanding the threat of malicious emails is ever increasing. Nonetheless, even users who claim to know the risks of unknown links in emails, click on the links in the emails they receive (Z. Benenson, Friedrich-Alexander University).

The rise in malware attacks associates with a rising concern over identity theft and identity fraud. In 2017, EQUIFAX™ announced a data breach affecting 143 million consumers worldwide. As such, there is a rapidly growing and urgent need for reliable authentication of electronic communications.

It would therefore be desirable to provide apparatus and methods for efficiently determining which received emails pose a threat to a user and which received emails are benign. It would also be desirable to provide apparatus and methods for preventing malicious emails from being received by a recipient, while facilitating safe receipt of non-malicious emails. It would be further be desirable to provide apparatus and methods for preventing receipt of bulk unsolicited emails and/or otherwise undesirable communications. It would also be desirable to provide apparatus and methods for reliably authenticating and verifying an identity of a sender of an electronic communication.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
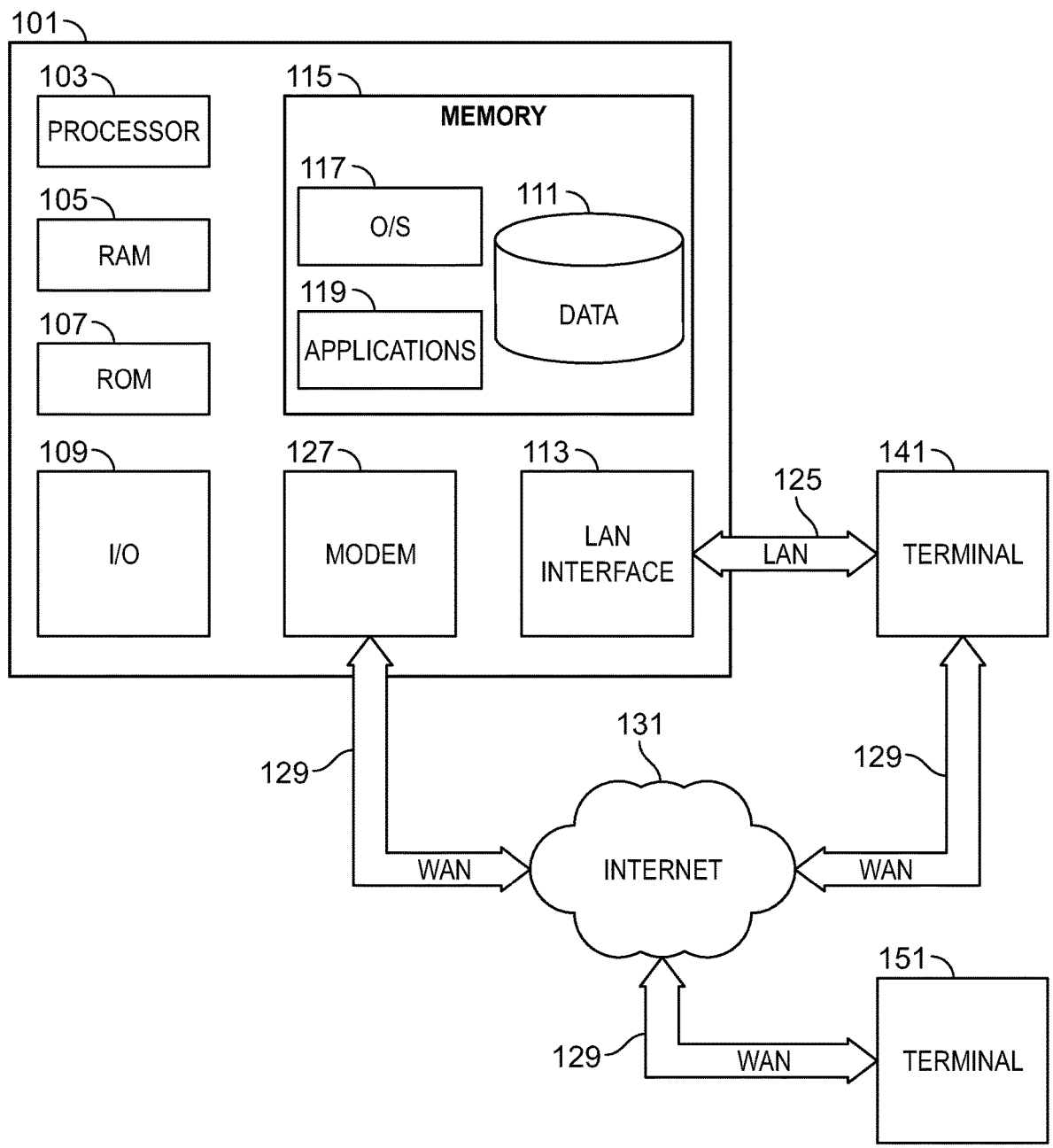
FIG. 1 shows illustrative apparatus for use with methods in accordance with principles of the invention.

Apparatus and methods are provided for authenticating and verifying a sender of an electronic communication. Apparatus and methods are provided for preventing receipt of unwanted and/or malicious communications. Apparatus and methods are also provided for efficiently determining which communications may pose a threat and which are benign. The invention may include methods and apparatus as set forth in U.S. application Ser. No. 12/983,936, "Utilization of Digit Sequences for Biometric Authentication," (now issued as U.S. Pat. No. 8,550,339) which is hereby incorporated by reference herein in its entirety.

The methods may include, and the apparatus may involve, a method for authenticating electronic communication(s). The method may include generating one or more than one whitelist database. The whitelist database may be associated with one or more than one account of one or more than one recipient. The whitelist database may include one or more than one identifying reference to one or more than one whitelist correspondent. The identifying reference may include one or more than one name, address, account number, and/or any suitable reference associated with the whitelist correspondent. The identifying reference may include any personally identifiable information, such as that shown in Table 1.

The generating of the whitelist database may include and/or involve receiving registration data from the whitelist correspondent. The registration data may include the identifying reference. The registration data may be associated with one or more than one penalty. The registration data may be associated with identifying information of the whitelist correspondent. The registration data may include the penalty. The registration data may include the identifying information.

The penalty may include one or more than one fee. For example, the registration data may include payment information, such as one or more than one credit card number and/or authorization for imposition of the fee from one or more than one payment account. The penalty may be for one or more than one fixed amount. The penalty may proportional to one or more than one detected property of the whitelist correspondent. For example, frequent correspondence to the recipient, may trigger one or more than one higher penalty than infrequent correspondence to the recipient. Similarly, correspondence to a large number of recipients originating from the correspondent may also trigger one or more than one higher penalty. The penalty may be one-time or imposed at regular intervals, such as daily, weekly, monthly or annually. The penalty may be of a sufficient cost to the whitelist correspondent so as to deter abusive and/or fraudulent communication, such as via opening duplicate accounts. Alternatively, or additionally, the registration data may be authenticated prior to entry of the registration data into the whitelist database.

The registration data may include the authorization to impose the penalty. The authorization may include electronic authorization, such as by electronic signature and/or using biometric data. The authorization may be for the fixed amount. The authorization may include acknowledgment of contractual terms of the imposition of the penalty.

The identifying information of the whitelist correspondent may include personally identifiable information. The identifying information may include one or more than one name such as a full name, parent's name or alias. The identifying information may include one or more than one personal identification number, such as a social security number, passport number, driver's license number, taxpayer identification number, patient identification number, financial account number and/or credit card number. The identifying information may include address information, such as a personal or business street or email address. The identifying information may include one or more than one personal or business telephone number.

The identifying information may include biometric data. The identifying information may include personal characteristics. The personal characteristics may include the biometric data. The biometric data may include the personal characteristics. The personal characteristics may include photographic image(s) (e.g., images of facial characteristics and/or other identifying characteristics), fingerprints and/or handwriting.

The biometric data may include one or more voice signatures. The biometric data may include one or more facial geometry. The biometric data may include one or more behavioral signatures. The behavioral signatures may include eye movement trajectory data. The behavioral signatures may include keystroke dynamics. The behavioral signatures may include mouse use characteristics.

The apparatus may involve, and the methods may include, biometric tracking of the biometric data. The biometric tracking may include one or more retina scans. The biometric tracking may include voice recognition. The biometric tracking may include eye tracking. The biometric tracking may include mouse movement tracking. The biometric tracking may include hand gesture recognition. The biometric tracking may include iris recognition techniques. The biometric tracking may include signature verification techniques. The biometric tracking may include and/or involve behavioral biometrics technology, such as VASCO™ DIGIPASS® for Apps Behavioral Authentication. (Such biometric and/or behavioral authentication techniques have been documented in, for example: International Journal of Information Security [2012]11(2): 65-83; Liu et al. Exploiting Eye Tracking for Smartphone Authentication. [2015].)

The apparatus may include, and the methods, may involve one or more sensors. The biometric tracking may involve the use of the sensors. The sensors may include one or more than one camera. The sensors may include one or more than one motion sensor. The sensors may include one or more than one accelerometer. The sensors may include one or more than one gyroscope. The sensors may include one or more than one pressure sensor. The sensors may include one or more than one microphone. The sensors may include a global positioning system.

The identifying information may include information identifying personally owned property, such as one or more than one vehicle identification number or title number. The identifying information may include one or more Internet Protocol (IP) or Media Access Control (MAC) addresses that link to the whitelist correspondent. The identifying information may include any suitable personally identifiable information.

TABLE 1

Illustrative identification data.

Illustrative identification data name
full name
maiden name
mother's maiden name
alias
login name
screen name
nickname
personal identification number (PIN)
social security number (SSN)
passport number
driver's license number
taxpayer identification number
patient identification number
financial account number
credit card number
address information
personal street address
personal email address
personal telephone number
personal characteristic
photographic image
fingerprint
signature
handwriting
biometric data
retina scan
voice signature
facial geometry
genetic information
biometric behavioral signatures
hand gesture dynamics
keystroke dynamics
mouse movement
finger movement patterns
swipe patterns
eye tracking patterns
property information
vehicle identification number (VIN)
title number
asset information
digital identity
internet protocol (IP) address
media access control (MAC) address
date of birth The generating of the whitelist database may include and/or involve cataloging into the whitelist database identification data of the whitelist correspondent. The identifying reference may include the identification data. The cataloging of the identification data may be in response to receiving the registration data. The identification data may be cataloged in association with the identifying reference. The identification data may be associated with one or more than one whitelist correspondent device, such as a server, desktop computer, laptop computer, tablet or cellphone, associated with the whitelist correspondent. The identification data may be associated with one or more than one whitelist correspondent address associated with the whitelist correspondent.

The method may include and/or involve generation of one or more than one blacklist database. The blacklist database may be associated with the account. The blacklist database may include one or more than one blacklist correspondent address.

The generating of the blacklist database may include identifying one or more than one suspicious property of the blacklist correspondent address. The suspicious property may indicate that communication(s) originating from the blacklist correspondent address may be unsolicited. The suspicious property may indicate that communication(s) originating from the blacklist correspondent address may be malicious.

The suspicious property may include the abusive and/or fraudulent communication. The suspicious property may include one or more attempts to register fraudulent accounts in the whitelist database. The suspicious property may include one or more attempts) to send bulk unsolicited communications and/or malware attacks.

The suspicious property may include a suspicious history associated with the blacklist address. The suspicious history may include a detected history of malicious behavior. The malicious behavior may include and/or involve spam, phishing scams and/or malware. The malicious behavior may be associated with the blacklist address. The spam, phishing scams and/or malware may be detected as originating from the blacklist address. The malicious behavior may be associated with one or more suspicious user associated with the blacklist address. The malicious behavior may be associated with one or more originating country associated with the blacklist address.

The generation of the blacklist database may include and/or involve cataloging, into the blacklist database, one or more of identification data associated with the blacklist correspondent address. The cataloging may be in response to the identification of the suspicious property of the blacklist correspondent address.

The method may include and/or involve receiving one or more than one electronic communication submitted by one or more than one sender for delivery to the recipient. The communication may include an email.

The method may include and/or involve one or more than one analysis of the content of the electronic communication for presence of identification data. The analysis may include scanning the communication. The scanning may include and/or involve detecting presence of data. The detected data may correspond to whitelist data stored in and/or otherwise associated with the whitelist database. The detected data may correspond to the identification data.

The analysis may be configured to detect the presence of one or more than one minimum threshold of identifying information. The identifying information may correspond to identify data previously recorded in the whitelist database.

The identity data may include a full name, mailing address and/or personal phone number. The threshold may require predetermined type(s) of identifying information. The threshold may require one or more than one code. The required code may include an alphanumeric and/or any other type of suitable code. The threshold may require a predetermined number(s) of identifying data. For example, the threshold may require the sender to submit at least two identifying data elements, such as a pin, a passcode and a birthplace. Alternatively, or additionally, the threshold may require, e.g., at least one of personally identifiable information (PII) such as full name, PIN and/or biometric data, and at least two of additional identifying information, such as a birthdate, birthplace and/or geographical indicator(s).

The method may include generating the code. The code may include a passcode. The code may include a pin. The code may include a password. The code may include a one-time-use passcode. The code may expire upon use. The code may be configured to be known only by the sender and the recipient. The generating may involve public-key systems. The generating may involve public and private key pair(s). The generating of the code may involve post-quantum cryptography. The generating may involve secret-key cryptography. The generating may involve hash trees. The generating may involve multivariate-quadratic systems.

The method may include delivery of the communication to the recipient. The delivery may be conditionally dependent upon determining that the electronic communication includes the minimum threshold of the identification data cataloged in the whitelist database.

The method may include blocking delivery of the communication. The blocking of the delivery of the communication may be conditionally dependent upon determination that the communication includes the identification data cataloged in the blacklist database.

The method may include facilitation of submission by the sender of the supplementary data. The facilitation may enable the sender to submit the supplementary data. The facilitation may include prompting the sender to submit the supplementary data. The submission of the supplementary data may be conditionally dependent upon a determination that the communication lacks the identification data cataloged in the blacklist database. The facilitation may be conditionally dependent upon determination that the communication lacks the minimum required threshold of identification data. The facilitation may be conditionally dependent upon determination that the communication lacks the identification data cataloged in the blacklist database, and further lacks the minimum threshold of identification data. The facilitation may include presenting the sender with one or more than one graphic user interface (GUI). The GUI may include one or more than one screen or window. The screen and/or window may include one or more than one request for the supplementary data. The screen and/or window may include guidance for submitting the supplementary data. The screen or window may include features for submitting the supplementary data. The features may include virtual buttons and/or any other suitable features.

The penalty may include a first penalty. The supplementary data may include the penalty. The supplementary data may include a second penalty including none, some or all properties of the first penalty. The supplementary data may include authorization to impose the second penalty. The second penalty may include a fee. The second penalty may be of sufficient cost to the sender so as to inhibit abuse, such as by sending bulk unsolicited communications. Costs imposed upon the sender by the first and/or second penalty may include limitation(s) of privileges regarding communication(s) from the sender, such as a delaying of receipt of the communication(s) sent by the sender, restricting a number of potential recipients of the communication(s) and/or any other suitable cost(s) and/or limitation(s), such as a loss of one or more other benefits.

The supplementary data may include additional identifying information. The additional identifying information may have remained undetected by the analysis of the communication. The additional identifying information may have been omitted in the communication. The supplementary data may include one or more than one code, such as a pin, password or passcode. The supplementary data may include biometric data.

The delivery of the communication to the recipient may be configured to occur after receipt of the supplementary data. The delivery may be conditionally dependent upon the receipt of the supplementary data. The delivery may be conditionally dependent upon a determination of a correspondence between the additional identifying information and the identification data of the whitelist correspondent. The determination may include matching the supplementary data to the identification data associated with the whitelist correspondent in the whitelist database. The delivery of the communication to the recipient may be configured to occur only after receipt of the second penalty and/or the determination.

The method may include generating one or more than one code, such as a pin, password and/or passcode. The code may be used by the whitelist sender in an electronic communication for sending to the recipient.

The method may include generating one or more than one blocked communication log. The blocked communication log may include blocked communication summary data of one or more than one incident in which one or more than one communication is blocked from delivery to the sender. The blocked communication summary data may include one or more than one reason for the blocking of the communication. The blocked communication summary data may include one or more than one date and/or time when the communication was blocked. The blocked communication summary data may include one or more than one reason for the blocking of the communication, such as non-correspondence of submitted supplementary data to whitelist data and/or failure to pay the penalty. The method may include creation of an entry in the blocked communication log. The creation of the entry may be in response to the blocking. The entry may include data corresponding to the communication. The summary data may include the data corresponding to the communication, such as sender, time sent, time received, originating country and/or reason for the blocking.

The method may include one or more than one submission of the log. The submission of the log may be to the recipient. The log may be submitted to the recipient. The submission may be to an entity responsible for reviewing authentication processes of the communications. The log may be submitted to the reviewing entity. The submission may be to an entity responsible for calibrating the authentication processes. The log may be submitted to the calibrating entity.

The methods may include, and the apparatus may involve, a method for authenticating one or more electronic communications. The method may include associating one or more than one correspondent address with one or more than one set of identity verification data. The set may comprise a first set of the identity verification data.

The method may include presenting one or more than one sender with one or more than one request for one or more than one username. The method may include presenting the sender with a first GUI. The first GUI may present the request. The first GUI may include one or more than one screen and/or window. The screen and/or window may include the request. The screen and/or window may include guidance for submitting the username. The screen and/or window may include feature(s) for submitting the username.

The method may include presenting the sender with one or more than one request for a second set of identity verification data. The screen or window may include the request. The screen or window may include guidance for submitting the second set of identity verification data. The screen or window may include features for submitting the second set of identity verification data.

The method may include providing the sender with access to an electronic communication account. The access may include and/or involve one or more feature(s) for composing one or more than one communication. The access may include and/or involve a second GUI. The second GUI may include one or more than one second GUI screen and/or one or more than one second GUI window. The second GUI screen and/or window may include the features for composing the communication. The second screen and/or window may include one or more features facilitating receipt of identity information. The second GUI may include features configured for composing the communication. The access to the electronic communication account may be conditionally dependent on a determination of a pre-established association between the username and the second identity verification data.

The method may include one or more than one presentation to the sender of one or more than one request for the first set of identity verification data. The presentation of the request for the first set of identity verification data may be conditionally dependent on initiation of an attempt by the sender to transmit the communication to the recipient. The sender may be presented with one or more than one feature for entering recipient data. The recipient data may include an email address and/or name of one or more than one designated recipient of the communication. The recipient data may include any suitable identifying data associated with the designated recipient of the communication. Upon receipt of the recipient data, the sender may be presented with one or more than one feature for entering the first set of identity verification data. The first set of identity verification data may include one or more than one code. The code may include one or more than one pin, passcode and/or password. The code may be one-time-use. The code may expire upon use. The code may be known only to the sender and/or the recipient.

The method may include transmitting the communication to the recipient. The apparatus may be configured such that, upon submission of the first set of identity verification data, the communication may be transmitted to the recipient. For example, the second GUI may include one or more than one "send" feature for submitting the communication. The send feature may be activated only upon authentication of the entered first set of identity verification data. Activation of the send feature may be visually demonstrated by the second GUI, e.g., by changing the coloring of the send feature.

The method may include authentication of the first set of identity verification data and/or the second set of identity verification data and/or any other suitable data for authenticating. The authentication may include single-factor, two-factor, multi-factor, strong and/or continuous authenticating processes. The authentication may include authenticating knowledge factor(s), such as password(s), pass phrase(s), PIN(s), challenge response(s), and/or security questions. The authentication may include authenticating ownership factor(s) such as detecting a built-in hardware or software token in an originating device of the communication. The authentication may include authenticating inherence factors, such as biometric identifiers, e.g., fingerprints, retinal patterns, DNA sequence, signature, face, voice and/or bio-electric signals. The bio-electric signals may be unique. The apparatus may be configured such that, upon the authentication of the first and/or second set of identity verification data, the communication may be transmitted to the recipient.

The methods may include, and the apparatus may involve, a method for verifying one or more than one identity of one or more than one sender of one or more than one electronic communication. The communication may be transmitted from a sender address to one or more than one intended recipient.

The method may include registration of one or more than one correspondent. The correspondent registration may include receiving the penalty and/or the identifying information from the correspondent. The correspondent registration may include registering the correspondent address. The correspondent registration may include registering the correspondent address in association with an account of the recipient. The registering may be in response to the receiving of the penalty and/or the identifying information. The correspondent registration may include associating the correspondent address with a first set of identity verification data. The correspondent registration may include receiving one or more than one desired username from the correspondent. The correspondent registration may include assigning the username to the correspondent. The correspondent registration may include registering the received username. The correspondent registration may include registering a second set of identity verification data in association with the username.

The method may include requesting a sender username. The user may include the correspondent. The sender username may include the correspondent username. The method may include presenting the sender with one or more than one request to submit identity verification data. The identity verification data may include the second set of identity verification data.

The method may include providing the sender with access to an electronic communication account. The access may be granted upon determination of a pre-established association between the submitted username and the submitted second identity verification data. The access may include/involve features facilitating composition of the communication. For example, the presentation of access to the electronic communication account may include providing one or more than one window in which the communication may be composed. The window may include feature(s) for composing the communication. The window may include feature(s) for submitting the communication. The window may include feature(s) for submitting identity verification data. The window may include feature(s) for authenticating the identity verification data.

The method may include requesting the first set of identity verification data from the sender. The request for the first set of identity verification data may be conditionally dependent upon initiation of an attempt by the sender to transmit the communication to the recipient. For example, the sender may activate the feature(s) for submitting the communication. The request for the first set of identity verification data may include guidance for submitting the first set of identity verification data. The request for the first set of identity verification data may include the feature(s) for submitting the identity verification data.

The method may include transmission of the communication to the recipient. The transmission may be conditionally dependent upon presentation, by the sender, of the first set of identity verification data. The transmission may be conditionally dependent upon the authentication of the first set of identity verification data presented by the sender.

The first set of identity verification data may include one or more than one password. The first set of identity verification data may include one or more than one personal identification number (PIN). The first set of identity verification data may include biometric data. The first set of identity verification data may include geographic information. The first set of identity verification data may include one or more than one of any suitable identity verification data, such as that shown in Table 1.

The second set of identity verification data may include one or more than one password, PIN, the biometric data and/or geographic information. The second set of identity verification data may include one or more than one of any suitable identity verification data, such as that shown in Table 1.

In some embodiments, the method may include generation of one or more than one "graylist" database in association with the account. The graylist database may include one or more than one graylist correspondent address of a graylist correspondent. The generation of the graylist database may include determining that the correspondent is not referenced in the whitelist database. The generation of the graylist database may include determining that the correspondent is not referenced in the blacklist database. The generation of the graylist database may include determining that reference to the correspondent appears on neither of the whitelist database nor the blacklist database. The method may include imposing the second penalty on the correspondent included in the graylist database prior to delivering one or more than one email submitted by the graylist correspondent. The method may include requiring the supplementary data from the graylist correspondent prior to delivering the submitted email from the graylist correspondent.

The apparatus may include, and the methods may involve, a system for digital authenticating and/or verification of one or more than one electronic communication. The communication may be transmitted by a sender to one or more than one recipient.

The system may include one or more than one transmitter. The transmitter may be configured transmit the electronic communication. The transmitter may include the processor. The transmitter may be included in the processor. The transmitter may be associated with one or more than one electronic communication account. The account may be associated with the sender. The account may be associated with the correspondent. The account may be associated with the recipient. The transmitter may be associated with a first of the more than one electronic communication accounts.

The system may include one or more than one receiver. The receiver may be configured to receive the electronic communication. The receiver may include the processor. The receiver may be included in the processor. The transmitter may include the receiver. The receiver may include the transmitter. The receiver may be associated with the account. The receiver may be associated with a second of the more than one electronic communication accounts.

The electronic communication may include one or more than one identifier. The identifier may be unique. The identifier may be known to the sender and the recipient. The identifier may be known only to the sender and the recipient. The identifier may include information held by a sending device and a receiving device. The information may only be held by the sending device and the receiving device. The sender may include the sending device. The sending device may include the transmitter. The recipient may include the receiving device. The receiving device may include the receiver. The receiver may be associated with the account of the recipient.

The processor may be configured to receive the identifier. The transmitter may be configured to receive the identifier. The processor may be configured to collect the identifier. The transmitter may be configured to collect the identifier. The identifier may include identifying data.

The instructions may cause the processor to perform one or more than one verification. The verification may be of the identifier. The verification may be of the identifying data. The instructions may cause the transmitter to perform the verification. The identifying data may be used by one or more of the verification(s).

The instructions may cause the processor to perform a transmission of the communication. The instructions may cause the processor to perform the transmission upon verification of the identifier. The transmitter may be configured to transmit the communication only upon the verification.

The transmitter may include one or more features. The features may be configured for composing the communication. The features may be configured to facilitate the composing of the communication. The features may be configured to enable the composing. The transmitter may be configured to present the features upon successful execution of one or more of the verifications.

The features may be configured for collecting identifying data. The identifying data may be used by one or more of the verifications. The identifying data may facilitate the one or more of the verifications. The features may be configured to enable the collecting of the identifying data. The features may be configured to enable the composing of the communication, substantially simultaneously to the collecting of the identifying data.

The features may include and/or involve hardware. The hardware may include one or more I/O device, such as a display, keyboard, mouse, touchscreen, microphone, fingerprint scanner, retina scanner, iris scanner, camera and/or button(s). The features may include and/or involve software, such as one or more GUI, virtual buttons, windows and/or voice recognition programs.

The transmitter may be configured to present the feature(s) upon one or more of the verification(s). The transmitter may be configured to activate the feature(s) upon one or more of the verification(s). The transmitter may be configured to present and/or activate the features only upon the one or more of the verification(s).

The receiver may be configured to receive the electronic communication. The receiver may be configured to receive the electronic communication only upon confirmation of the validity of the identifier.

The identifier may include one or more than one barcode, such as a matrix barcode or QR code. The confirmation of the validity of the identifier may be mediated by one or more than one barcode scanner, such as a matrix barcode scanner or QR code scanner. The scanner may be electronically associated with the receiver.

The identifier may include one or more than one one-time password. The identifier may expire after use.

The identifier may include the biometric data. The confirmation of the validity of the identifier may be mediated by one or more than one biometric scanner. The biometric scanner may be electronically associated with the receiver.

The identifier may expire upon indication that one or more than one account associated with the sender has been compromised. The identifier may expire upon indication that one or more than one account associated with the recipient has been compromised. The identifier may expire upon indication that one or more than one relationship between the sender and the recipient has been terminated.

The apparatus may include, and the methods may involve, a system for verifying and/or authenticating one or more than one electronic communication. The system may include one or more than one processor. The system may include one or more than one computer-readable electronic medium. The medium may comprise one or more than one memory. The medium may include one or more computer-executable instructions.

The instructions, when executed by the processor, may receive the communication. The instructions, when executed by the processor, may cause receipt of the communication. The instructions, when executed by the processor, may cause the processor to receive the communication.

The instructions, when executed by the processor, may perform one or more than one analysis of the communication. The instructions, when executed by the processor, may cause the processor to perform the analysis. The analysis may include analyzing the communication for inclusion of one or more than one set of identity data associated with a sender of the communication. The analysis may include one or more than one verification of one or more than one identifier included in and/or with the communication. The identifier may include the identity data.

The instructions, when executed by the processor, may perform a comparison of the identity data to one or more than one list of registered senders and/or correspondents. The analysis may include the comparison. The instructions, when executed by the processor, may cause the processor to perform the comparison.

The instructions, when executed by the processor, may perform one or more than one determination. The instructions, when executed by the processor, may cause the processor to perform the determination. The determination may be whether the identity data corresponds to an account that has been flagged as compromised. The determination may be whether the identity corresponds to an account that has been terminated.

The instructions, when executed by the processor, may perform a transmission of the email to one or more than one intended recipient. The instructions, when executed by the processor, may cause the processor to perform the transmission. The transmission may be dependent upon the determination that the identity corresponds to one or more than one registered account that is active and/or uncompromised.

The apparatus may involve, and the methods may include, one or more than one biometric authentication process. The process(es) may be configured to occur prior to accessing of the communication by a user. The process(es) may be configured to occur subsequent to the accessing. The process(es) may be configured to occur substantially simultaneous to the accessing.

The accessing may include viewing the communication. The accessing may include reading the communication. The accessing may include composing the communication. The accessing may include editing the communication.

One or more identifier reader may be configured to identify a person accessing the communication. The identifier reader may be configured to verify an identity of the person accessing the communication.

The identifier reader may include the camera. The identifier reader may include one or more iris scanner. The identifier reader may include one or more retina scanner.

The identifier reader may include one or more fingerprint scanner. The fingerprint scanner may include and/or involve one or more than one fingerprint sensor, such as FINGERPRINT CARDS™ sensor model FPC1025. The fingerprint sensor may be embedded in one or more than one user input device, such as a key, touchscreen and/or button.

The communication may include an email. The email may include a message. The message may be composed by the sender. The message may include body content of the email.

The transmitter may be configured to insert one or more than one authentication string into the message in one or more pieces. The string may be generated based on data collected by the identifier reader. The string may be encrypted. The string may indicate that the message may be composed by an authorized user. The string may indicate that the message may be entirely composed by an authorized user. The transmitter may be configured to insert the string into the message in one or more pieces to tag the message as entirely composed by the authorized user.

The receiver may be configured to verify that the received communication(s) include the string(s). The receiver may be configured authenticate the string(s). The receiver may be configured to perform delivery of the email upon authentication of the string(s). The delivery of the email may include presentation of the email to the recipient. The receiver may be configured to deliver the email only upon the authentication of the string(s).

The identifier reader may include hardware integrated as part of a communication viewing device. The identifier reader may include hardware integrated as part of a communication composing and/or editing device. The identifier reader may include the camera. The camera may be front facing. The identifier reader may include one or more fingerprint reader. The fingerprint reader may be embedded in one or more keypads. The fingerprint reader may be embedded in one or more keys. The fingerprint reader may be embedded in one or more buttons. The fingerprint reader may be embedded in one or more touchpad. The fingerprint reader may be embedded in one or more touchscreen.

Authentication of the communication may include spatial pattern tracking. The authentication may include spatial pattern mapping.

The apparatus may include, and the methods may involve, an electronic communication authenticating system. The system may include processors configured to execute machine-readable program code. The system may include media configured to store the program code. The program code may include machine-readable instructions. A first medium may include a first set of the instructions. A second medium may include a second set of the instructions.

The system may include one or more than one data reader. The data reader may be configured to communicate electronically with one of the processors. The data reader may be configured to collect identifying data from a sender of the communication. The data reader may include one or more than one iris scanner, retina scanner, fingerprint scanner, global positioning system, camera and/or microphone.

The second set of instructions, when executed by the processor, may cause the second processor to perform one or more than one insertion of the identifying data into the communication. The insertion(s) may be at one or more than one distributed time point(s). The time point may occur during composition by the sender of the communication. The identifying data may be included in the identifier.

The verification may include confirmation of one or more than one predetermined association between the identifier and the account of the recipient. The identifier may include one or more than one code known only to the recipient and a sender of the communication. The identifier may be read by a QR code scanner electronically associated with the transmitter. The identifier may include one or more than one one-time password. The identifier may include biometric data. The transmitter may be associated electronically with a biometric scanner configured to read the biometric data.

The transmitter may be associated with the account of the sender. The sender account may be configured to be accessible only upon one of a plurality of the verifications. The verification may include authentication of one of a plurality of the identifiers submitted by the sender. The identifier may have been previously associated with the sender. The system may include the hardware configured to collect the identifier.

Access to the account of the recipient may be maintained only upon a plurality of repeated verifications. The plurality of verifications may be of a plurality of received identifiers. The plurality of verifications may be of a plurality of receivings of the same identifier. The plurality of verifications may be of a plurality of receivings of the different identifiers. The plurality of identifiers may include the different identifiers. The plurality of identifiers may include the same identifier received at different time points. The identifier(s) may have been previously associated with the recipient.

The identifier may expire upon certain conditions. The conditions may include an indication that one or more than one account has been compromised. The account may be associated with the sender. The account may be associated with the recipient. The conditions may include an indication of a termination of a relationship between the recipient and the sender.

The apparatus may include, and the methods, may involve, a system for verifying and authenticating an electronic communication. The system may include one or more than one processor. The system may include one or more than one medium including computer-executable instructions.

The instructions, when executed by the processor, may cause the processor to receive the communication. The instructions, when executed by the processor, may cause the processor to analyze the communication for inclusion of one or more than one embedded identifier. The identifier may indicate an identity of a sender of the communication. The instructions, when executed by the processor, may cause the processor to compare the identifier to one or more than one database of one or more registered identifiers.

The instructions, when executed by the processor, may cause the processor to determine if the identifier is associated with one or more than one account that has been flagged as compromised. The instructions, when executed by the processor, may cause the processor to determine if the identifier is associated with one or more than one account that has been terminated.

The instructions, when executed by the processor, may cause the processor to perform a transmission of the email to an intended recipient. The transmission may be dependent upon a determination that the identity is associated with a registered account. The transmission may be dependent upon a determination that the account is active. The transmission may be dependent upon a determination that the account is uncompromised. The transmission may be dependent upon a determination that the account is registered, active and uncompromised.

The sender may include one or more than one sending device. The sending device(s) may include the transmitter. The sending device(s) may include associated hardware of the transmitter. The sending device(s) may include external hardware of the transmitter. The sending device(s) may include internal hardware of the transmitter. The sending device may include computers, cellphones and/or any suitable device(s).

The identifier may include one or more than one attribute of the sending device(s). The attribute may include software and/or a program, such as a security program and/or firewall, running on the device. The attribute may include a device identifier, such as an alphanumeric code. The attribute may include a location of the device. The attribute may include a type and/or included features of the device. The attribute may include hardware electronically associated with the device.

The apparatus may include, and the methods may involve, one or more than one mechanism configured to facilitate engagement of the system by one or more persons with disabilities. The authentication may be automatic. The authentication may receive identifying data automatically. The system may facilitate one or more manually selected and/or automatically selected option(s) for inputting one or more different types of identifying data. The option(s) may include the fingerprint scan. The options may include the retina scan. The options may include voice recognition. The options may include voice analysis. The options may include facial feature analysis. The options may include any suitable method for receiving authenticable information from a user having one or more than one disability.

The disability may include loss of motor control. The disability may include paralysis. The disability may include digit amputation(s). The disability may include enucleation. The disability may include muteness. Any suitable method may include alternate option(s). The alternate option(s) may be based on the disability.

The options may include capturing at one or more regular and/or irregular intervals one or more than one image of the user accessing the communication. The capturing may be automatic. The capturing may be mediated by the camera.

The apparatus may include, and the methods may involve, one or more than one authentication mechanism. The mechanism may be configured to engage automatically upon detection that a device accessing the communication is positioned at one or more than one predetermined location. The device may be approved for accessing the communication upon detecting one or more device properties. The properties may include a detected location of the device. The location may be determined by the GPS. The device properties may include a device identifier. The device identifier may include machine characteristics. The accessing may include composing the communication. The accessing may include sending the communication. The accessing may include transmitting the communication. The accessing may include viewing the communication. Based on one or more of the device properties, the device may be automatically authorized. Based on one or more of the device properties, the device may be trained to engage the system automatically. The engagement may the authentication of the user accessing the device.

The methods may include, and the apparatus may involve, conversion of voice to text. The system may be configured to record content of a narration by the sender. The system may be configured for transcribing the content into the communication. The system may be configured for recording identifying voice data of the sender. The identifying voice data may be included in the narration. The system may be configured to record the content of the narration by the sender for transcribing into the communication, substantially simultaneously to recording identifying voice data of the sender. The system may be configured to authenticate the voice data prior to delivering the communication to the recipient. The communication may include a reply to previous correspondence received by the sender from the recipient.

The methods may include, and the apparatus may involve, one or more than one multi-tiered approval. The approval may be for transmitting the communication(s). The approval may include and/or involve one or more than one of the authentication(s). The approval may include and/or involve one or more than one of the verification(s).

The approval may depend on a sensitivity of content of the communication(s). The approval may depend on an identity of recipient(s) of the communication(s). The approval may depend on a number of the recipient(s). The approval may depend on a sensitivity of email content. The approval may depend on an identity of recipient(s) of the email. The approval may depend on a number of the recipient(s).

The identifier may include a split identifier. The split identifier may include a split code. The split identifier may include a split PIN. The split identifier may include a plurality of portions. The split identifier may include a sequence. The sequence may include a plurality of subsequences. The sequence may include a string. The string may include a plurality of substrings.

Each of a plurality of registered correspondents may have access to a portion of the split identifier. The portion may include one of the subsequences. The portion may include one of the substrings.

Upon retrieval of a plurality of portions, the communication(s) may be delivered. Delivery of the communication may depend on retrieval of the plurality of portions. In some embodiments of the invention, the delivery may depend on assembly of the entire string from the substrings retrieved from the plurality of recipients.

In some embodiments of the invention, the transmittal of the communication(s) may depend on assembly of the entire string from the substrings retrieved from the plurality of recipients. The delivery may depend on the assembly. The entire string may be assembled from the substrings. The entire string may be transmitted. The entire string may be included in the transmitted communication.

Complete assembly of the split identifier may be required to access the communication. The assembly may be required to transmit the communication. The assembly may be required to deliver the communication. The assembly may be required to view the communication. The assembly may be required to read the communication. In some embodiments, a plurality of users may each have a portion of the split identifier. The portion may be associated with a part of the communication. Each of the plurality of users may have access to the part of the communication associated with the identifier portion of the user. The access may depend on receipt of the portion. The access may include/involve decryption of the portion. The access may include/involve opening of the portion.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 is an illustrative block diagram of system 100 based on computer 101. The methods of the invention may involve and/or be implemented using a system, such as system 100. The apparatus of the invention may include a system, such as system 100.

Computer 101 may include processor 103 for controlling operation of computer 101 and associated components. Computer 101 may include RAM 105, ROM 107, input/output ("I/O") module 109 and memory 115. Processor 103 may execute software running on computer 101,—e.g., operating system 117. Other components commonly used for computers such as EEPROM or Flash memory or any other suitable components may also be part of computer 101.

Memory 115 may be comprised of any suitable permanent storage technology—e.g., a hard drive. Memory 115 may store software, such as operating system 117, application(s) 119 and data 111, used for operation of system 100. Alternatively, or additionally, some or all of the computer-executable instructions may be embodied in hardware or firmware (not shown). Computer 101 may execute the instructions embodied by the software to perform various functions, such as one, some or all of the steps of the methods.

I/O module 109 may include wired and/or wireless (e.g., via BLUETOOTH™ and/or WiFi™ connection(s)) connectivity to a microphone, keyboard, touch screen, and/or stylus through which a user of computer 101 may provide input. I/O module 109 may include one or more speakers for providing audio output. I/O module 109 may include one or more than one video display device for providing textual, audiovisual and/or graphical output. System 100 may be connected to other systems via, for example, LAN interface or adapter 113.

System 100 may operate in a networked environment supporting connections to one or more remote computers, such as terminals 141 and 151. Terminals 141 and 151 may include personal computer(s) and/or server(s) that may include similar element(s) to those described in connection with system 100. The connections may include local area network (LAN) 125. The connections may include wide area network (WAN) 129. The connections may include other network(s). When used in a LAN networking environment, computer 101 may be connected to LAN 125 through LAN interface 113. When used in a WAN networking environment, computer 101 may include modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, or alternatively, application program(s) 119, which may be used by computer 101, may include machine-executable instructions for invoking user functionality related to communication, such as email, Short Message Service (SMS), and voice input and speech recognition applications.

Computer 101 and/or terminals 141 and/or 151 may also comprise devices including various other components, such as one or more than one battery, speaker, and/or antenna (not shown).

Terminal 151 and/or terminal 141 may comprise portable devices such as one or more than one laptop, tablet, cell phone, or any other suitable device for storing, transmitting and/or transporting relevant information. Terminals 151 and/or terminal 141 may comprise other devices. These devices may be identical to system 100 or different. The differences may be related to hardware components and/or software components.

Figure 2:
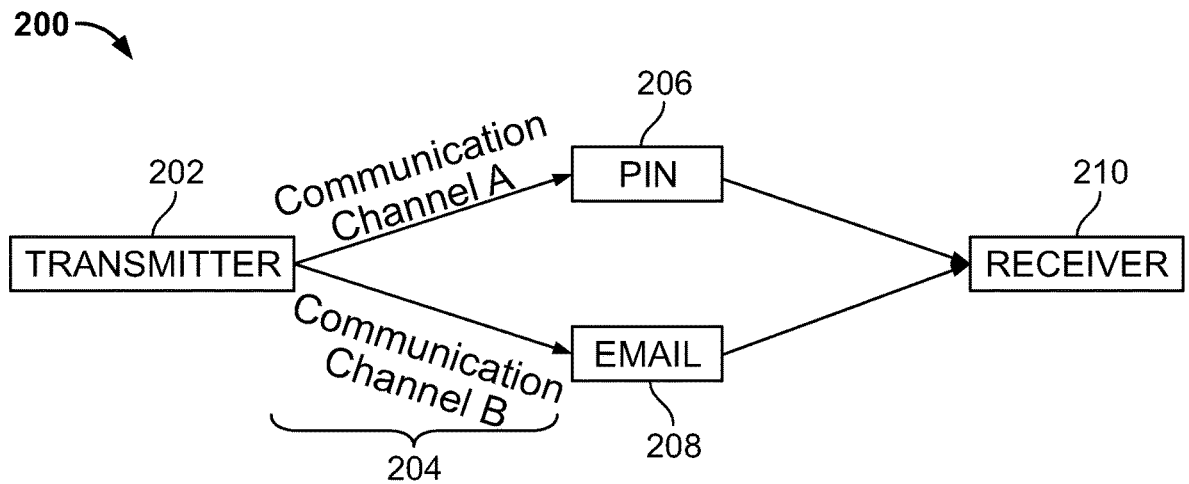
FIG. 2 is an illustrative flow diagram in accordance with principles of the invention.

FIG. 2 shows illustrative process 200. Process 200 may be mediated by one or more systems that may include none, some or all parts of system 100 (shown in FIG. 1). Process 200 may involve transmitter 202. Transmitter 202 may include and/or involve the correspondent and/or sender. Transmitter 202 may include and/or involve a system (such as system 100) for submitting an identifier, such as PIN 206. PIN 206 may be submitted by transmitter 202 over communication channels 204, such as communication channel A. Transmitter 202 may include and/or involve a system for submitting correspondence, such as email 208. Email 208 may be submitted by transmitter 202 over communication channels 204, such as communication channel B. In some embodiments, transmitter 202 may be configured to transmit email 208 over communication channel B only upon the transmission of PIN 206. Transmitter 202 may be configured to transmit email 208 over communication channel B only upon the authentication of PIN 206. Transmitter 202 may transmit email 208 to receiver 210 in a separate transmission from the transmission of PIN 206 to receiver 210.

PIN 206 and email 208 may be accepted by receiver 210. Receiver 210 may include and/or involve a system (such as system 100) for receiving an identifier, such as PIN 206. Receiver 210 may include and/or involve a system for receiving correspondence, such as email 208. In some embodiments, receiver 210 may be configured to receive email 208 via communication channel B only upon the authentication of PIN 206 received via communication channel A. Receiver 210 may include and/or involve the recipient. Receiver 210 may be configured to deliver email 208 received via communication channel B to the recipient only upon the authentication of PIN 206 received via communication channel A. Alternatively, or additionally, delivery of email 208 may depend on prior confirmed receipt of a penalty and/or other supplementary information, over one or more of communication channels 204.

Figure 3:
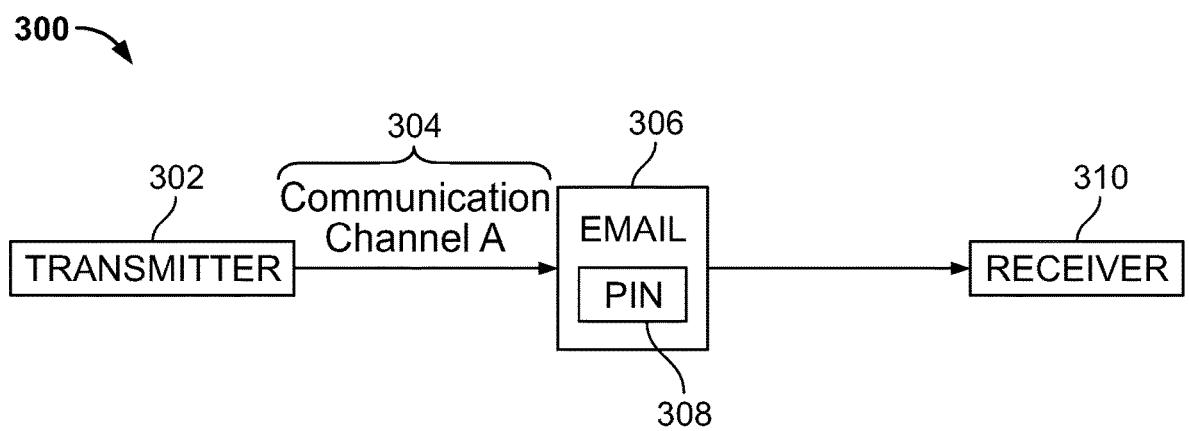
FIG. 3 is an illustrative flow diagram in accordance with principles of the invention.

FIG. 3 shows illustrative process 300. Process 300 may be mediated by one or more systems that may include none, some or all parts of system 100 (shown in FIG. 1).

Process 300 may involve transmitter 302. Transmitter 302 may include and/or involve the correspondent and/or sender. Transmitter 302 may include and/or involve a system (such as system 100) for submitting an identifier, such as PIN 306. PIN 306 may be submitted by transmitter 302 over connection 304, such as communication channel A.

Transmitter 302 may include and/or involve a system for submitting correspondence, such as email 308. Email 308 may be submitted by transmitter 302 over communication channels 304, such as communication channel A. Transmitter 302 may be configured to transmit email 308 over communication channel A only upon the authentication of PIN 306. Email 308 may include PIN 306. Transmitter 302 may transmit email 308 with PIN 306 to receiver 310. In some embodiments, transmitter 302 may be configured to transmit email 308 after authentication of PIN 306, e.g., at transmitter 302.

PIN 306 and email 308 may be accepted by receiver 310. Receiver 310 may include and/or involve a system (such as system 100) for receiving the identifier, such as PIN 306. Receiver 310 may include and/or involve a system for receiving correspondence, such as email 308. Receiver 310 may be configured to receive email 308 via communication channel A only upon the authentication of PIN 306 included in email 308. Receiver 310 may include and/or involve the recipient. Receiver 310 may be configured to deliver email 308 received via communication channel A to the recipient only upon the authentication of PIN 306 included in email 308. Alternatively, or additionally, delivery of email 308 may depend on prior confirmed receipt of a penalty and/or other supplementary information, over connection 304.

Figure 4:
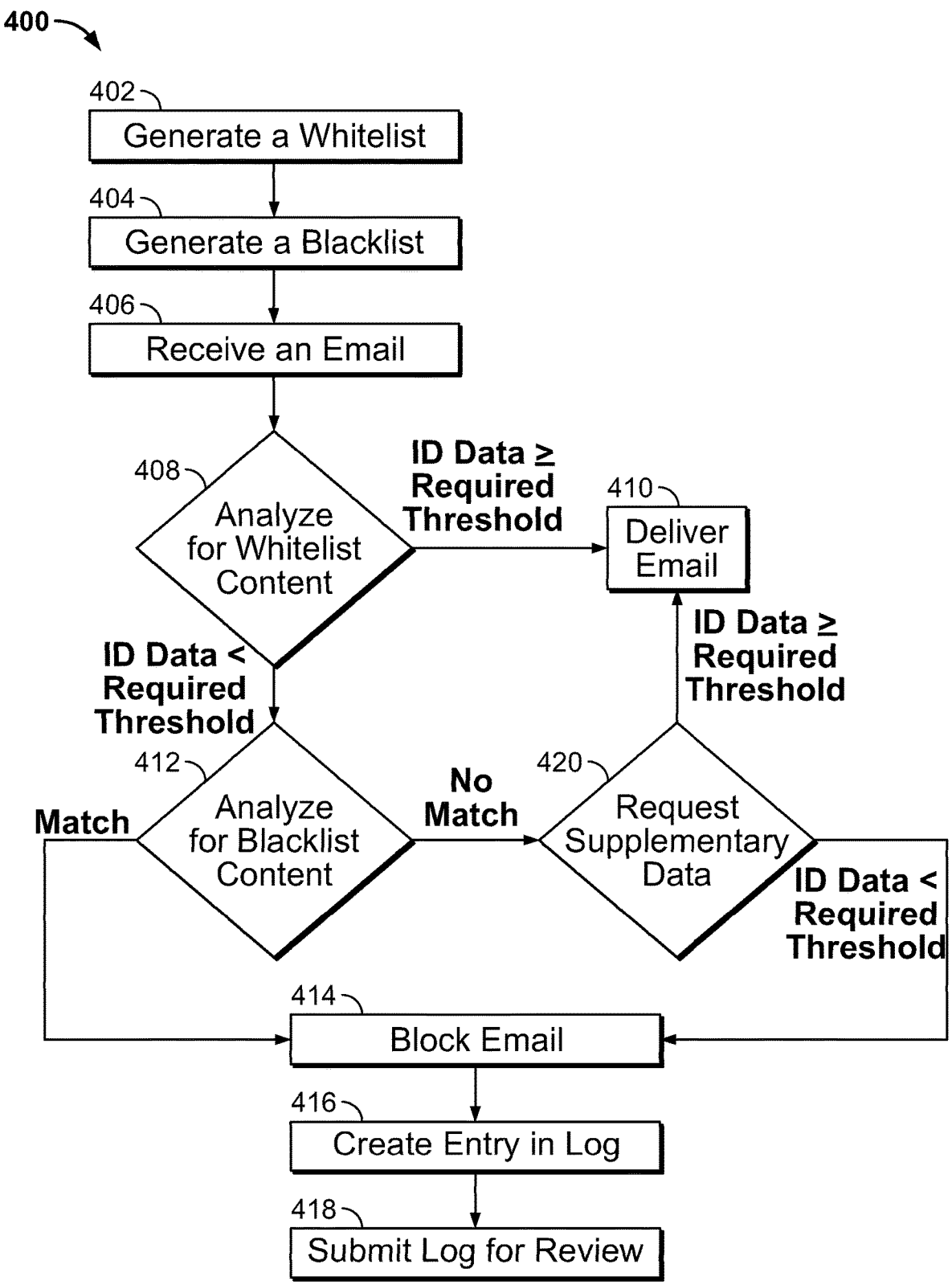
FIG. 4 is an illustrative flow diagram in accordance with principles of the invention.

FIG. 4 shows illustrative authentication process 400. One, some or all of steps of process 400 may be mediated by a system (such as system 100 shown in FIG. 1). Process 400 may begin at step 402.

At step 402, a whitelist, such as the whitelist database, is generated, e.g. by processor 103 (shown in FIG. 1). the whitelist may include one or more than one reference to one or more than one whitelist correspondent. The whitelist may be associated with one or more than one account of one or more than one recipient. The whitelist may include one or more than one identifying reference to the whitelist correspondent. The identifying reference may include one or more than one name, address, account number, and/or any suitable reference associated with the whitelist correspondent. The identifying reference may include personally identifiable information. Entry into the whitelist database may dependent upon receiving a penalty, such as personally identifying information and/or a fee. The penalty may be submitted by the whitelist correspondent and/or by an authorized third party.

At step 404, a blacklist, such as the blacklist database, is generated, e.g. by processor 103, including one or more than one reference to one or more than one blacklist correspondent. The generation of the blacklist may be conducted prior to, substantially simultaneously to, and/or later than the generation of the whitelist. The blacklist may be associated with the account of the recipient. The blacklist may include one or more than one identifying reference to the blacklist correspondent. The identifying reference may include one or more than one address and/or any suitable reference associated with the blacklist correspondent. The generating of the blacklist may include identifying one or more than one suspicious property of the blacklist correspondent address.

The suspicious property may indicate that communication(s) originating from the blacklist correspondent address is unsolicited. The suspicious property may indicate that communication(s) originating from the blacklist correspondent address is malicious. The suspicious property may include a suspicious history associated with the blacklist address.

At step 406, an email or other electronic communication may be received. The receipt of the email may be by the receiver. The receipt of the email may be by receiver 210. The receipt of the email may be by receiver 310. The receipt of the email may be mediated by a processor, such as processor 103 (shown in FIG. 1), executing the computer-executable instructions.

At step 408, the email may be analyzed for whitelist content, e.g. by processor 103 executing the computer-executable instructions. The whitelist content may include identifying information of the sender. The identifying information of the sender may correspond to data previously stored in the whitelist. The analysis may include the authentication of the identifying information. The analysis may include determining that a required threshold of a predetermined minimum amount of identifying data is included in the email. The analysis may include determining that the predetermined minimum amount of identifying data included in the email is authenticated.

If the authenticated identifying data meets or exceeds the required threshold, the email may be delivered to the recipient (step 410).

If the authenticated identifying data does not meet the required threshold, the email may be analyzed for blacklist content (step 412). The analysis for blacklist content may be conducted prior to, substantially simultaneously to, and/or later than the analysis for whitelist content. The blacklist analysis may include determining if content of the email corresponds to data stored in the blacklist, such as suspicious link(s), suspicious originating address, suspicious originating country and/or any other suitable indicator of malicious and/or otherwise undesirable content of the email.

Upon indication that the email is undesirable, such as by matching the content to data stored in the blacklist indicative of fraudulent activity, maliciousness and/or spam, the email may be blocked (step 414) from delivery to the recipient.

In some instances and/or embodiments of the invention a blacklist designation may override a whitelist designation. In some instances and/or embodiments of the invention a whitelist designation may override a blacklist designation. In some embodiments, contradictory designations may trigger submission for further analysis.

At step 416, an entry corresponding to the blocking of the email may be entered into a blocked email log file. The entry may include data corresponding to the blocked email, such as the time, date, originating address and/or reason the email was blocked. Data from the entry may be used to update the blacklist automatically and/or manually by an entity responsible for managing authentication processes.

At step 418, the log file may be submitted for review. The review may be performed by the entity. The review may be performed by the recipient. The review may determine if the email should not have been blocked. The review may determine if the process may need calibration. The review may determine if the blacklist may need to be updated.

If the blacklist analysis fails to find the content of the email as indicative of undesirableness of the email, for example, by failure to match data stored in the blacklist indicative of undesirableness, supplementary data may be requested from the sender (step 420). For example, if the sender address of the email matches none of blacklisted addresses stored in the blacklist, the sender may be requested to submit supplementary data prior to delivery of the email. The supplementary data may include additional identifying information and/or a penalty/fee.

Upon determining receipt of sufficient supplementary data, for example, by verifying receipt of the penalty and/or verifying that the threshold has been met and/or exceeded by the supplementary data, the email may be delivered to the recipient (step 410).

Upon determining receipt of insufficient supplementary data, the request may be reinitiated (not shown). In some embodiments, after one or more than one attempt to receive sufficient supplementary data fail, delivery of the email may be blocked (step 414). For example, if the sender repeatedly submits non-authenticatable supplementary data, additional attempts by the sender to submit the email may be prevented, e.g. by automatically rerouting the sender to an error screen in response to the additional attempts.

In some embodiments, after one or more than one attempt to receive sufficient supplementary data fail, the sender may be blacklisted. The blacklisting of the sender may include entering data associated with the sender into the blacklist. The data associated with the sender may include originating address, originating device address, originating country, submitted data and/or any other suitable data.

Figure 5:
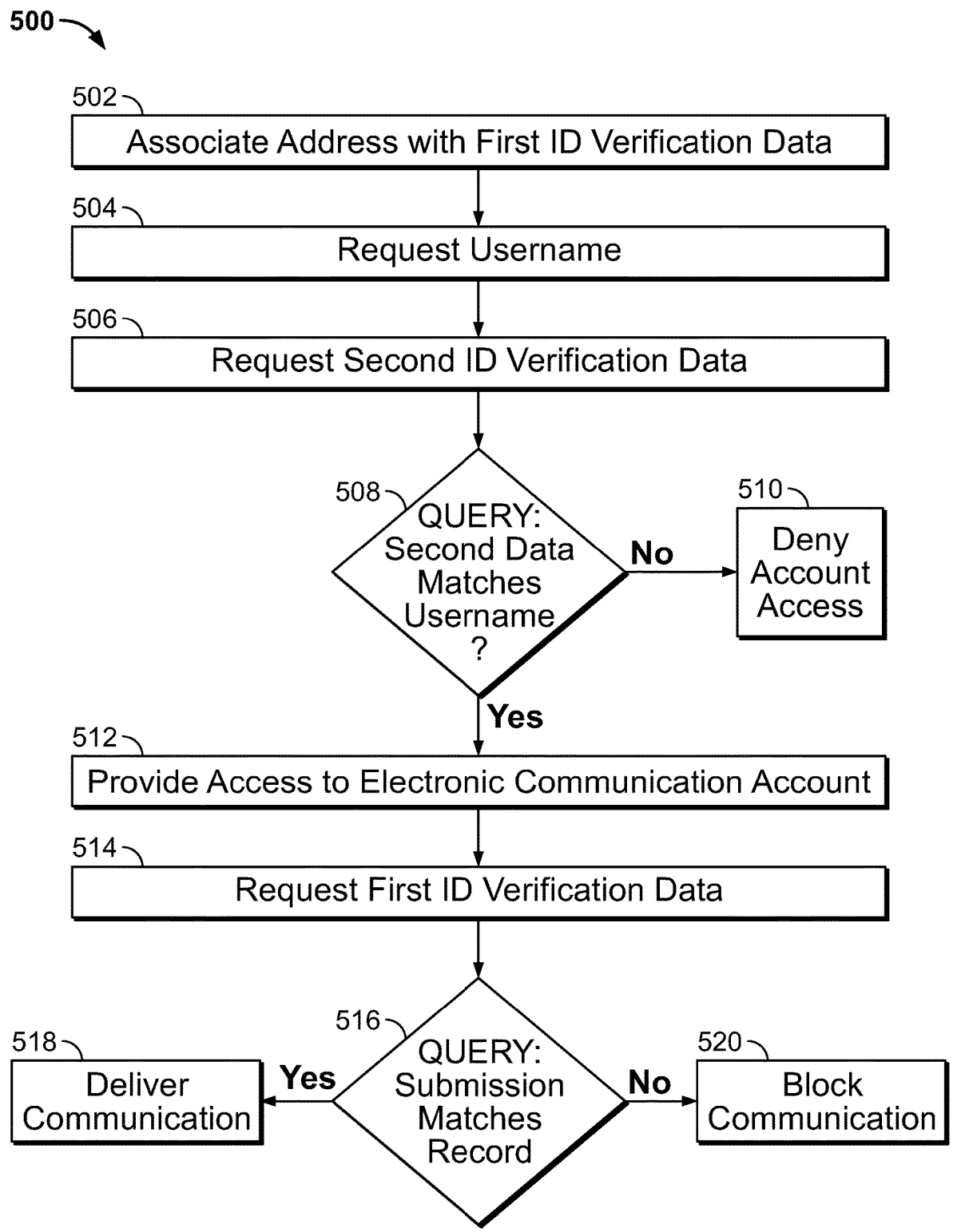
FIG. 5 is an illustrative flow diagram in accordance with principles of the invention.

FIG. 5 shows illustrative authentication process 500. One, some or all of steps of process 500 may be mediated by a system (such as system 100 shown in FIG. 1). Process 500 may begin at step 502.

At step 502, one or more than one electronic communication address, such as an email address, may be associated with a first set of identity verification data, such as identifying information and/or an alphanumeric code. The address may include an address of a sender. The address may include an address of a recipient. In some embodiments, the association between the address and the first set of data may be performed during registration of the address into a whitelist. In some embodiments, the alphanumeric code may be associated with both a sender address and a recipient address.

At step 504, a username may be requested. The request may be mediated by a graphic user interface (GUI). The GUI may be presented upon access by a user of a site, such as a website.

At step 506, a second set of identity verification data, such as identifying information may be requested. The request may be mediated by the GUI. The request may be mediated by a second GUI.

At step 508, the submitted username and second set of identity data may be analyzed for a preestablished association, for example, in the whitelist. The whitelist may include a list of paired username(s) and identity data. The analysis may involve checking if the submitted username matches the submitted identity data based on a whitelist pairing. If the second set of identity data fails to match the username, access to an electronic communication account may be denied (step 510).

In some embodiments, after one or more than one failed attempt to receive corresponding username and identity data from a user, a user may be blocked from attempting to access the account (not shown). The blocking may be permanent. A predetermined number of failed attempts may trigger the blocking. In some embodiments, after one or more than one failed attempt to receive corresponding username and identity data from the user, the user may be blacklisted (not shown). The blacklisting of the user may include entering data associated with the user into the blacklist. The data associated with the user may include originating device address and/or submitted data and/or any other suitable data.

If the second set of identity data matches the username according to the preestablished association, access to the account may be provided (step 512). The access may be mediated by a third GUI, such as GUI 600 (shown in FIG. 6). The GUI may include features, such as windows, for drafting a communication. The features may facilitate submission of an identifier of one or more than one designated recipient.

At step 514, the first set of identity verification data may be requested of the user. The request may be mediated by the third GUI. The third GUI may include features facilitating submission of the first set of identity verification data.

At step 516, the submitted identity verification data may be analyzed. The analysis may evaluate if the submitted data matches the first set of identity verification data associated with the address. For example, if the submitted data includes a code, the analysis may determine if the submitted code matches a stored code associated with one or more of the sender and/or recipient addresses. The analysis may be automated, such as by an automated transmitter and/or receiver. The analysis may be performed manually, for example, by a recipient receiving the data prior to receiving the content of the communication. The analysis may include and/or involve machine-learning algorithms.

If the submitted data matches the first set of identity verification data associated with the address, the communication may be delivered to the recipient (step 518).

If the submitted data does not match the first set of identity verification data associated with the address, the communication may be blocked from delivery to the recipient (step 520).

In some embodiments, after one or more than one failed attempt to receive the first set of identity verification data from the user, the user may be blocked from additional attempts at submitting the communication and/or other communications to the recipient (not shown). In some embodiments, after one or more than one failed attempt to receive the first set of identity verification data associated with the address from the user, the account of the user may be closed (not shown). In some embodiments, after one or more than one failed attempt to receive corresponding username and identity data from the user, the user may be blacklisted (not shown).

Figure 6:
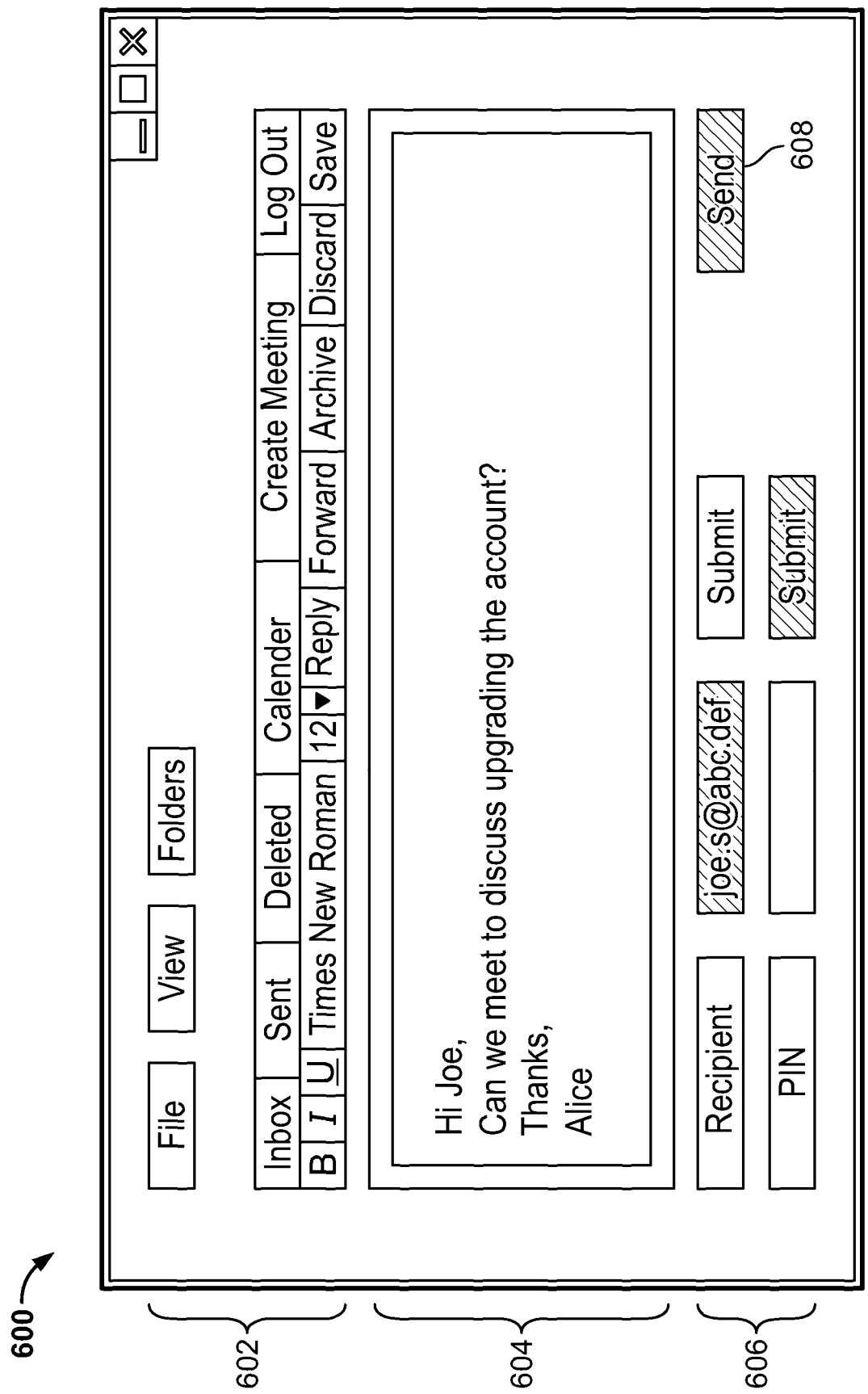
FIG. 6 shows an illustrative system view in accordance with principles of the invention.

FIG. 6 shows illustrative graphic user interface (GUI) 600. GUI 600 may be configured to be accessed upon successful authentication of submitted data, such as in step 512 (shown in FIG. 5).

GUI 600 may include features 602. Features 602 may facilitate composition of an electronic communication for delivery to a recipient. Features 602 may facilitate access to additional account features and/or programs.

GUI 600 may include window 604. Window 604 may facilitate composition of the communication therein.

GUI 600 may include feature(s) 606. Feature(s) 606 may be configured to facilitate submission of data. The data may include one or more than one recipient address. The data may include one or more than one set of identity verification information, such as identifying information and/or an alphanumeric code.

GUI 600 may include send button 608. Send button 608 may be in an inactivated state prior to authentication of the data. Inactivated state(s) of button(s) may be visually indicated to the user by presenting the button(s), such as button 608, as "grayed out" and/or at a lower contrast relative to activated button(s). The authentication may include one or more than one confirmation of preestablished association between two or more of the submitted data, such as between a sender address, recipient address and/or the code. Upon the authentication, button 608 may be activated. The activation of button 608 may be visually indicated by increasing the contrast of button 608 (not shown). Upon activation, the user may select button 608 in order to submit the communication to the recipient.

Figure 7:
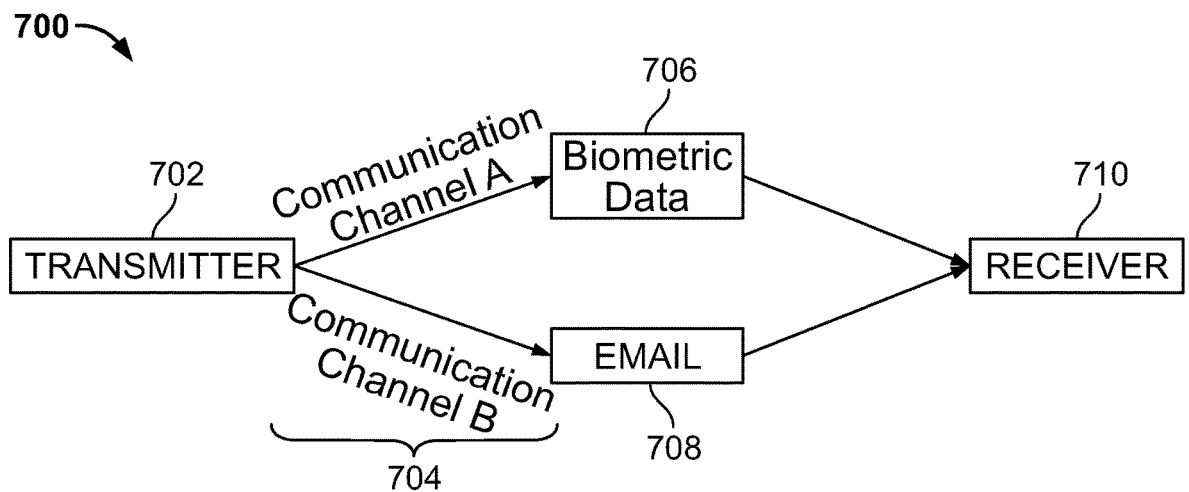
FIG. 7 is an illustrative flow diagram in accordance with principles of the invention.

FIG. 7 shows illustrative process 700. Process 700 may be mediated by one or more systems that may include none, some or all parts of system 100 (shown in FIG. 1). Process 700 may involve transmitter 702. Transmitter 702 may include and/or involve the correspondent and/or sender. Transmitter 702 may include and/or involve a system (such as system 100) for submitting biometric data 706. Biometric data 706 may be scanned by a biometric reader (not shown). Biometric data 706 may be submitted by transmitter 702 over communication channels 704, such as communication channel A. Transmitter 702 may include and/or involve a system for submitting correspondence, such as email 708. Email 708 may be submitted by transmitter 702 over communication channels 704, such as communication channel B.

In some embodiments, transmitter 702 may be configured to transmit email 708 over communication channel B only upon the transmission of biometric data 706. Transmitter 702 may be configured to transmit email 708 over communication channel B only upon the authentication of biometric data 706. Transmitter 702 may transmit email 708 to receiver 710 in a separate transmission from the transmission of biometric data 706 to receiver 710.

Biometric data 706 and email 708 may be accepted by receiver 710. Receiver 710 may include and/or involve a system (such as system 100) for receiving an identifier, such as biometric data 706. Receiver 710 may include and/or involve a system for receiving correspondence, such as email 708. In some embodiments, receiver 710 may be configured to receive email 708 via communication channel B only upon the authentication of biometric data 706 received via communication channel A. Receiver 710 may include and/or involve the recipient. Receiver 710 may be configured to deliver email 708 received via communication channel B to the recipient only upon the authentication of biometric data 706 received via communication channel A. Alternatively, or additionally, delivery of email 708 may depend on prior confirmed receipt of a penalty and/or other supplementary information, over one or more of communication channels 704.

Figure 8:
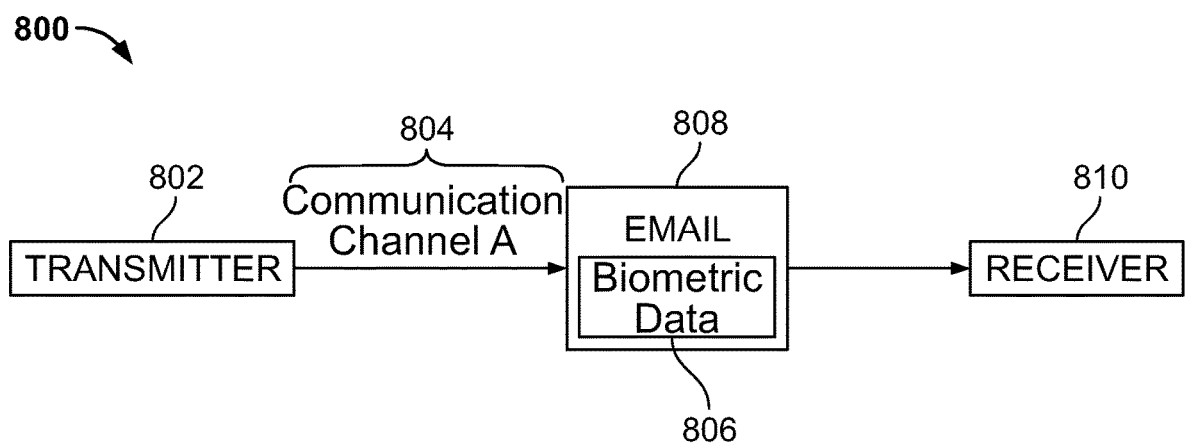
FIG. 8 is an illustrative flow diagram in accordance with principles of the invention.

FIG. 8 shows illustrative process 800. Process 800 may be mediated by one or more systems that may include none, some or all parts of system 100 (shown in FIG. 1).

Process 800 may involve transmitter 802. Transmitter 802 may include and/or involve the correspondent and/or sender. Transmitter 802 may include and/or involve a system (such as system 100) for submitting an identifier, such as biometric data 806. Biometric data 806 may be submitted by transmitter 802 over connection 804, such as communication channel A. Transmitter 802 may include and/or involve a system for submitting correspondence, such as email 808. Email 808 may be submitted by transmitter 302 over communication channels 804, such as communication channel A. Transmitter 802 may be configured to transmit email 808 over communication channel A only upon the authentication of biometric data 806. Email 808 may include biometric data 806. Biometric data 806 may be collected by a biometric reader (not shown) during composition of email 808. Biometric data 806 may be collected intermittently during composition of email 808 and inserted into email 808. Transmitter 802 may transmit email 308 with biometric data 806 to receiver 810. In some embodiments, transmitter 802 may be configured to transmit email 808 after authentication of biometric data 806, e.g., at transmitter 802.

Biometric data 806 and email 808 may be accepted by receiver 810. Receiver 810 may include and/or involve a system (such as system 100) for receiving the identifier, such as PIN 806. Receiver 810 may include and/or involve a system for receiving correspondence, such as email 808. Receiver 810 may be configured to receive email 808 via communication channel A only upon the authentication of biometric data 806 included in email 808. Receiver 810 may include and/or involve the recipient. Receiver 810 may be configured to deliver email 808 received via communication channel A to the recipient only upon the authentication of biometric data 806 included in email 808. Alternatively, or additionally, delivery of email 808 may depend on prior confirmed receipt of a penalty and/or other supplementary information, over connection 804.

Figure 9:
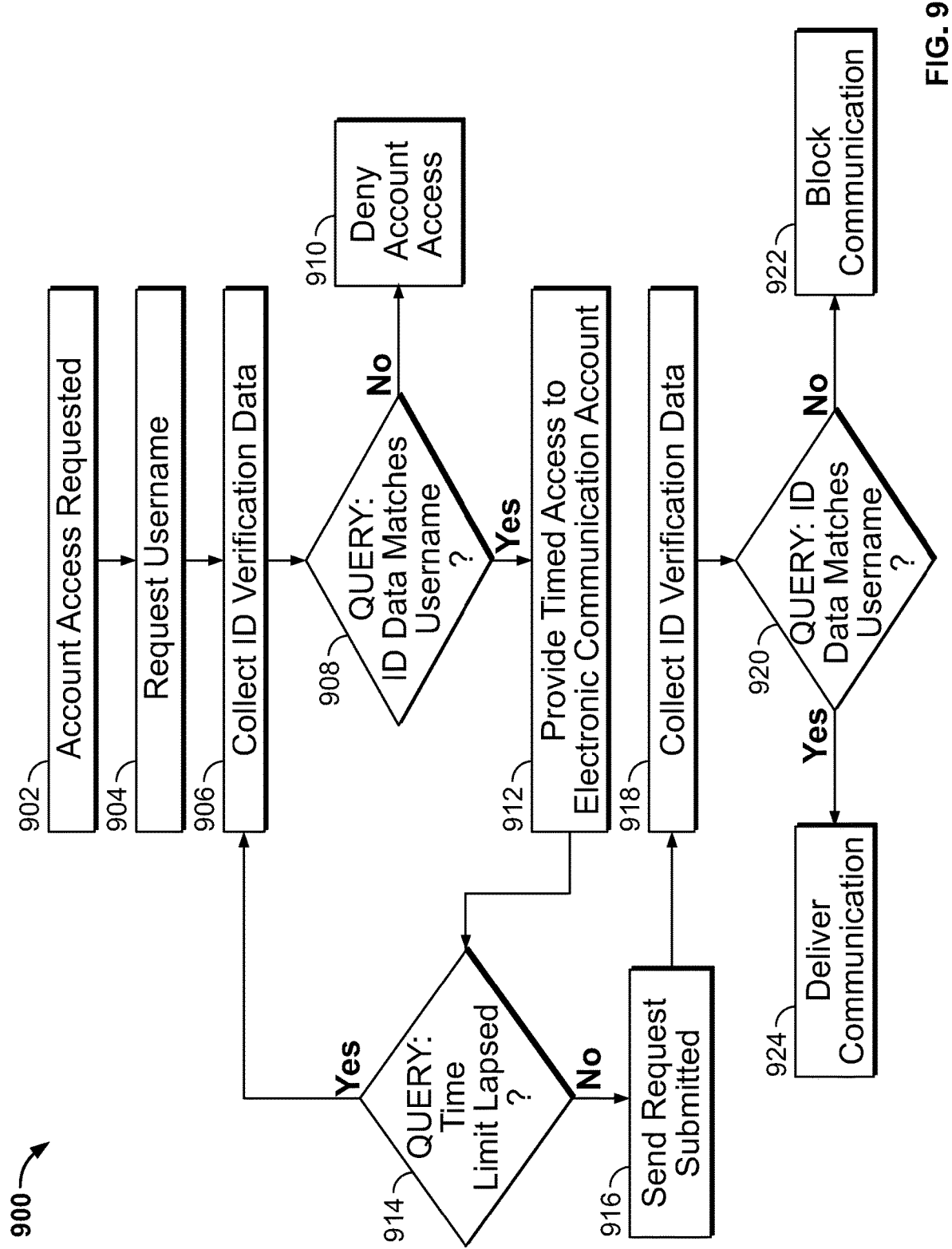
FIG. 9 is an illustrative flow diagram in accordance with principles of the invention.

FIG. 9 shows illustrative authentication process 900. One, some or all of steps of process 900 may be mediated by a system (such as system 100 shown in FIG. 1). Process 900 may begin at step 902.

At step 902, a user may request access to an electronic communication account. The request may include accessing a site, such as a website, associated with the account. The request may include opening an application associated with the account.

At step 904, a username may be requested. The request may be mediated by a graphic user interface (GUI). The GUI may be presented upon access by the user of the site. The GUI may be presented upon access by the user of the application.

At step 506, identity verification data, such as identifying information may be collected. The collecting may be performed by a data scanner. The information may include biometric data. The scanner may include a biometric reader. The scanner may include a code scanner, such as a barcode scanner. The scanner may include a camera. The scanner may include a fingerprint scanner. The scanner may include any suitable scanner for collecting identifying data.

At step 908, the submitted username and collected identity data may be analyzed for a preestablished association, for example, in the whitelist. The whitelist may include a list of paired username(s) and identity data. The analysis may involve checking if the submitted username matches the submitted identity data based on a whitelist pairing.

If the collected identity data fails to match the username, access to the electronic communication account may be denied (step 910).

If the second set of identity data matches the username according to the preestablished association, timed access to the account may be provided (step 912). The access may be mediated by a second GUI, such as GUI 600 (shown in FIG. 6). The second GUI may include features, such as windows, for drafting a communication. The features may facilitate submission of an identifier of one or more than one designated recipient.

At step 914, a system clock and/or timer may indicate whether a predetermined amount of time has lapsed since identifying data was last collected. If the predetermined amount of time has lapsed, the data reader may attempt to collect identity verification data again from the user (step 906). The collected data may again be authenticated (step 908) in order to enable the user to continue accessing the account (step 912). Steps 914, 906 and 908 may continue to repeat until the user submits a request to send the communication (step 916).

Upon submission of the request, the system may again request identity verification data (step 918). The data may include that previously submitted at step 906 and/or additional data not previously submitted. The data may include a PIN, password, or any suitable identifying data.

At step 920, the submitted identity verification data may be authenticated. At step 920, the submitted identity verification data may be analyzed. The analysis may evaluate if the submitted data matches the previously submitted identity verification data. The analysis may evaluate if the submitted data matches the previously submitted username. The analysis may determine if the submitted data matches stored data associated with one or more of the sender and/or recipient addresses. The analysis may be automated, such as by an automated transmitter and/or receiver. The analysis may be performed manually, for example, by a recipient receiving the data prior to receiving the content of the communication. The analysis may include and/or involve machine-learning algorithms.

If authentication of the submitted data fails, the communication may be blocked from delivery to the recipient (step 922).

If the submitted data is successfully authenticated, the communication may be delivered to the recipient (step 924).

Figure 10:
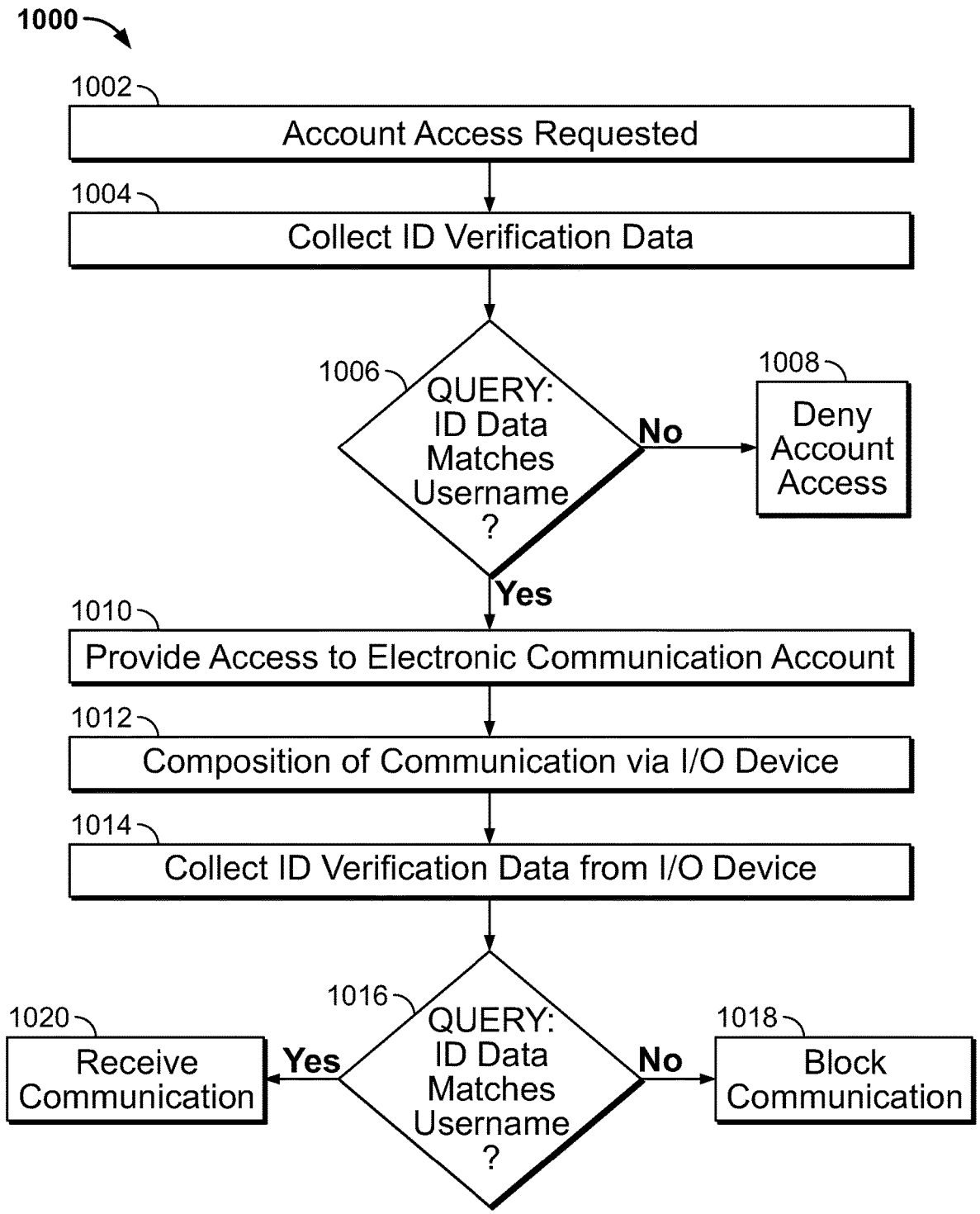
FIG. 10 is an illustrative flow diagram in accordance with principles of the invention.

FIG. 10 shows illustrative authentication process 1000. One, some or all of steps of process 1000 may be mediated by a system (such as system 100 shown in FIG. 1). Process 1000 may begin at step 1002.

At step 1002, a user may request access to an electronic communication account. The request may include accessing a site, such as a website, associated with the account. The request may include opening an application associated with the account.

At step 1004, identity verification data, such as identifying information may be collected. The collecting may be performed by a data scanner. The information may include biometric data. The scanner may include a biometric reader. The scanner may include a code scanner, such as a barcode scanner. The scanner may include a camera. The scanner may include a fingerprint scanner. The scanner may include any suitable scanner for collecting identifying data.

In some embodiments, the identifying data may include a username and/or PIN. At step 1004, the username/PIN may be requested. The request may be mediated by a graphic user interface (GUI). The GUI may be presented upon access by the user of the site. The GUI may be presented upon access by the user of the application.

At step 1006, the submitted username and collected identity data may be analyzed for a preestablished association, for example, in the whitelist. The whitelist may include a list of paired username(s) and identity data. The analysis may involve checking if the submitted username matches the submitted identity data based on a whitelist pairing. In some embodiment, at step 1006, the identity data is authenticated without a submitted username, by automatically matching the identity data to previously recorded data associated with a user account.

At step 1008, if the authentication fails, the user may be denied access to the account. In some embodiments, if the collected identity data fails to match the username, access to the account may be denied (step 1008).

At step 1010, if the authentication succeeds, the user may be granted access to the account. The access may be mediated by a graphic user interface (GUI), such as GUI 600 (shown in FIG. 6).

At step 1012, the user may compose an electronic communication, such as an email, using one or more than one I/O device. The I/O device may include a keyboard, mouse, microphone, camera and/or any suitable I/O hardware and/or software. The I/O device may present the user with the GUI. The GUI may include features, such as windows, for drafting the communication.

At step 1014, identity verification data may be collected from the user by the I/O device(s). The data may include that previously collected at step 1004 and/or other identifying data. The I/O device may be configured to collect the data substantially simultaneously to the composition of the communication. A real and/or virtual keyboard for typing the communication may include one or more embedded fingerprint scanners for collecting identifying fingerprint data. A camera and/or eye scanner may collect the identifying data. A touch screen may collect the identifying data. In some embodiment, the composition may be vocally generated, e.g. in a recorded and/or transcribed communication, and the identifying data may include identifying voice data.

At step 1016, the collected identity verification data may be authenticated. At step 1016, the submitted identity verification data may be analyzed. The analysis may evaluate if the submitted data matches the previously submitted identity verification data. The analysis may evaluate if the submitted data matches the previously submitted username. The analysis may determine if the submitted data matches stored data associated with one or more of the sender and/or recipient addresses. The analysis may be automated, such as by an automated transmitter and/or receiver. The analysis may be performed manually, for example, by a recipient receiving the data prior to receiving the content of the communication. The analysis may include and/or involve machine-learning algorithms.

At step 1018, if authentication of the submitted data fails, user access to the communication may be blocked. At step 1018, if authentication of the submitted data fails, the communication may be blocked from delivery to the recipient. A receiver may be configured to block the communication upon a failure of the authentication of the data.

At step 1020, if the submitted data is successfully authenticated, the communication may be delivered to the recipient. The receiver may be configured to receive the communication only upon successful authentication of the data.

Figure 11:
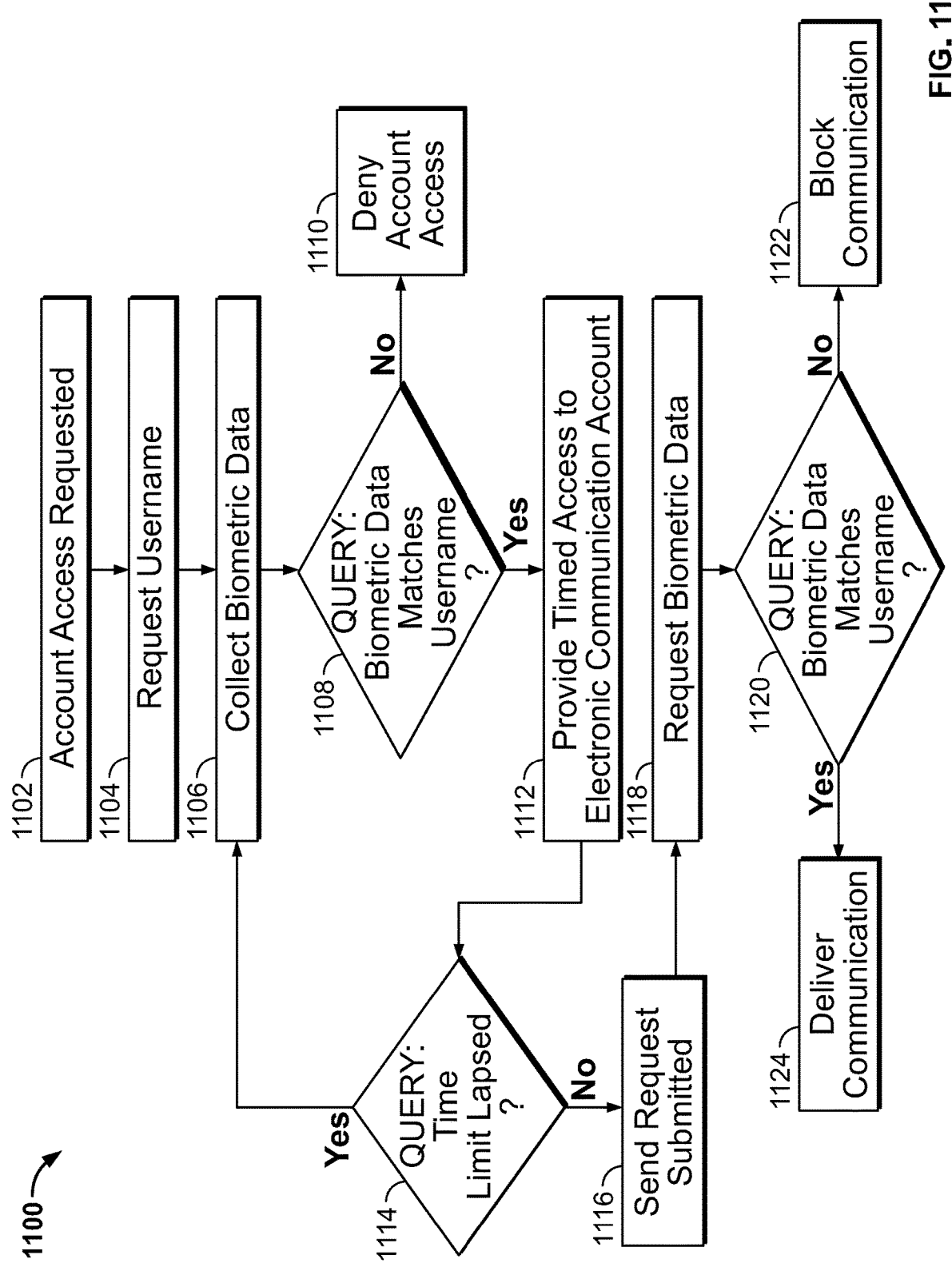
FIG. 11 is an illustrative flow diagram in accordance with principles of the invention.

FIG. 11 shows illustrative authentication process 1100. One, some or all of steps of process 1100 may be mediated by a system (such as system 100 shown in FIG. 1). Process 1100 may begin at step 1102.

At step 1102, a user may request access to an electronic communication account. The request may include accessing a site, such as a website, associated with the account. The request may include opening an application associated with the account.

At step 1104, a username may be requested. The request may be mediated by a graphic user interface (GUI). The GUI may be presented upon access by the user of the site. The GUI may be presented upon access by the user of the application.

At step 1106, identifying biometric data may be collected. The collecting may be performed by a biometric scanner. The scanner may include a camera. The scanner may include a microphone. The scanner may include a fingerprint scanner. The scanner may include an iris scanner. The scanner may include a retina scanner. The scanner may include any suitable scanner for collecting biometric data.

At step 1108, the submitted username and/or collected biometric data may be authenticated. The submitted username and collected biometric data may be analyzed for a preestablished association. For example, the whitelist may include a list of paired username(s) and biometric data. The analysis may involve checking if the submitted username matches the submitted biometric data based on a whitelist pairing.

At step 1110, if the collected biometric data fails to match the username, access to the account may be denied.

At step 1112, if the authentication of the submitted is successful, timed access to the account may be provided. Success of the authentication may include successful matching of the second set of biometric data to the username. The account accessed may include an account previously associated with the username and/or the biometric data. The access may be mediated by the GUI and/or by a second GUI, such as GUI 600 (shown in FIG. 6). The second GUI may include features, such as windows, for drafting a communication. The features may facilitate submission of an identifier of one or more than one designated recipient.

At step 1114, a system clock and/or timer may indicate whether one or more than one predetermined amount of time has lapsed since biometric data was last collected. The amount of time may include one or more than one interval. The interval(s) may be fixed, such as every thirty seconds, every two minutes, every five minutes, every thirty minutes, every two hours or any suitable interval. The predetermined time may include irregular interval(s). The predetermined time may include interval(s) of randomized duration(s).

If the predetermined amount of time has lapsed, the data reader may attempt to collect biometric data again from the user (step 1106). In some embodiments, one or more than one action of the user may trigger the attempt to collect the data. The attempt may be triggered by a predetermined number of keystrokes by the user. The attempt may be triggered by the time interval passing without any interaction by the user with the system and/or GUI. The attempt may be triggered by the time interval passing without any keystrokes by the user. Collection of the data may or may not be indicated to the user. Indication of the collection may involve one or more than one indicator light, sound and/or prompt.

The collected data may again be authenticated (step 1108) in order to enable the user to continue accessing the account (step 1112).

Steps 1114, 1106 and 1108 may continue to repeat until the user submits a request to send the communication (step 1116).

Upon submission of the request, the system may again request biometric data (step 1118). The data may include that previously submitted at step 1106 and/or additional data not previously submitted.

At step 1120, the submitted biometric data may be authenticated. At step 1120, the submitted biometric data may be analyzed. The analysis may evaluate if the submitted data matches the previously submitted biometric data. The analysis may evaluate if the submitted data matches the previously submitted username. The analysis may determine if the submitted data matches stored data associated with one or more of the sender and/or recipient addresses. The analysis may be automated, such as by an automated transmitter and/or receiver. The analysis may include and/or involve machine-learning algorithms.

If authentication of the submitted data fails, the communication may be blocked from delivery to the recipient (step 1122).

If the submitted data is successfully authenticated, the communication may be delivered to the recipient (step 1124).

Figure 12:
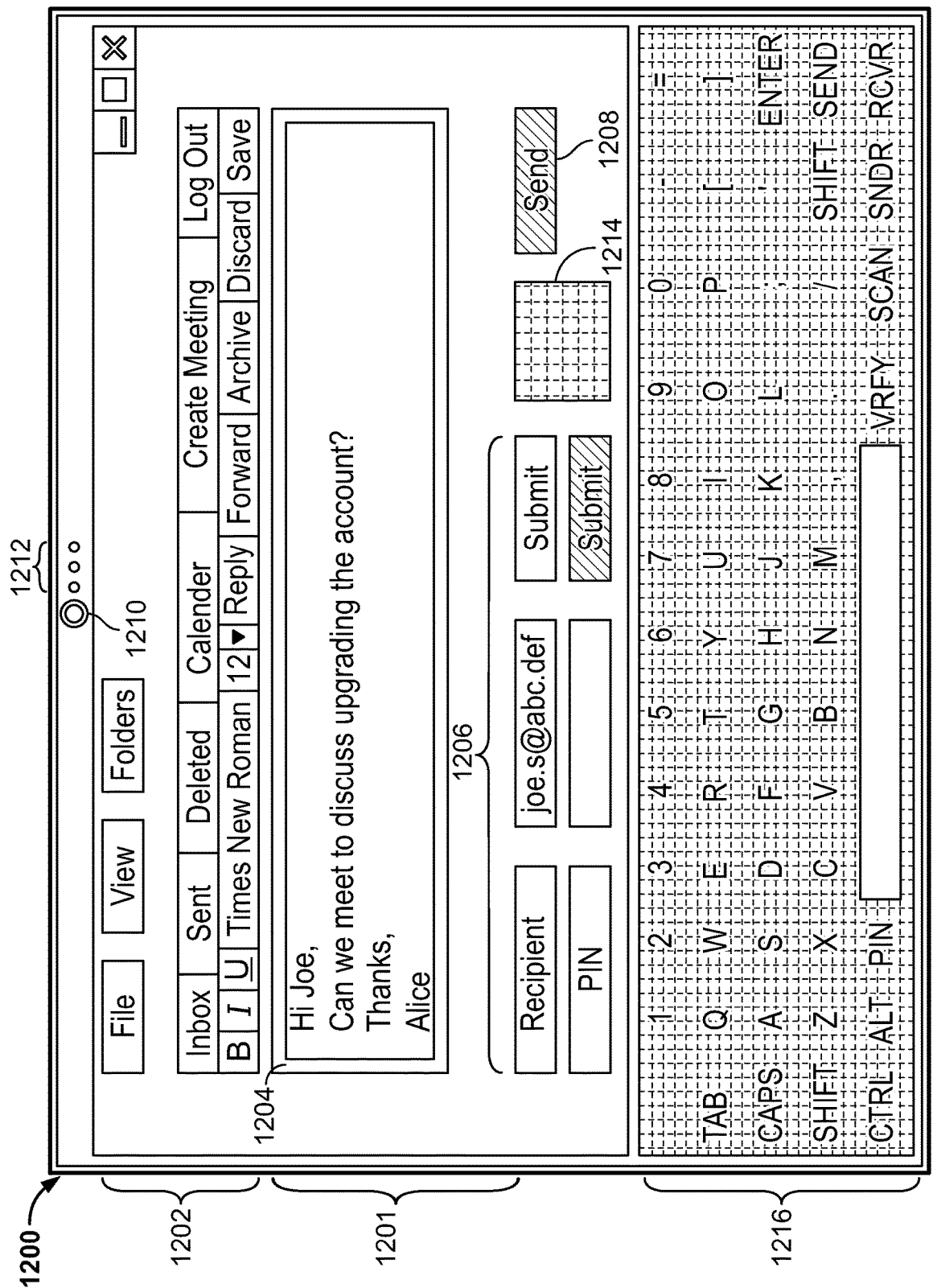
FIG. 12 shows a view of illustrative apparatus in accordance with principles of the invention.

FIG. 12 shows illustrative secure communication device 1200. Device 1200 may include hardware and/or software configured for a user to compose electronic communication(s) such as one or more keyboard(s), touchscreen(s), display(s), mouse, trackball, rollerball, touchpad, head control, eye control, microphone and/or voice access.

Device 1200 may include hardware and/or software configured for collecting identity verifying data from the user. Device 1200 may be configured to present graphic user interface (GUI) 1201. GUI 1200 may include some or all features of GUI 600 (shown in FIG. 6). GUI 1201 may be configured to be accessed upon successful authentication of submitted data, such as in step 512 (shown in FIG. 5), step 912 (shown in FIG. 9) step 1010 (shown in FIG. 10) and step 1112 (shown in FIG. 11).

Device 1200 may include one or more features 1202. Feature(s) 1202 may include one or more depressible buttons. Feature(s) 1202 may be configured for activating specialized function(s) of device 1200. The function(s) may be indicated on external surfaces of features(s) 1202. The functions may include accessing virtual folders, databases and/or files stored in device 1200. The functions may include adjusting one or more settings of device 1200. Features 1202 may facilitate composition of an electronic communication. The functions may include adjusting one or more settings of the communication being composed on device 1200. Feature(s) 1202 may include virtual button(s). GUI 1201 may include one or more of features 1202. Features 1202 may be configured to facilitate access to additional account features and/or programs.

Device 1200 may include window 1204. GUI 1201 may include window 1204. Window 1204 may facilitate composition of the communication therein. Window 1204 may present the communication as the communication is being composed by the user.

GUI 1201 may include feature(s) 1206. Feature(s) 1206 may be configured to facilitate submission of identifying data. The data may include one or more than one recipient address. The data may include one or more than one set of identity verification information, such as identifying information and/or an alphanumeric code. Feature(s) 1206 may include buttons and/or virtual buttons for submitting the data. A predetermined sequence of data submissions may be mediated by activation of a first set of features 1206 configured to be dependent upon successful submission and/or authentication of previously submitted data, such as via a second set of feature(s) 1206. Inactivated state(s) of feature(s) 1206 may be indicated visually to the user, such as by presenting indicated function(s) of inactivated feature(s) at a lower contrast ("grayed out") than indication(s) of activated function(s)/feature(s).

Device 1200 may include send button 1208. Send button 1208 may include a depressible button configured for sending the communication. Send button 1208 may include a virtual button included in GUI 1201. Send button 1208 may be in an inactivated state prior to authentication of the data. Inactivated state(s) of button(s) may be visually indicated to the user by presenting button 1208, as "grayed out" and/or at a lower contrast relative to activated button(s). The authentication may include one or more than one confirmation of preestablished association between two or more of the submitted data, such as between a sender address, recipient address and/or the code. Upon the authentication, button 1208 may be activated. The activation of button 1208 may be visually indicated by increasing the contrast of button 1208 (not shown). Upon activation, the user may select button 1208 in order to submit the communication to the recipient. In some embodiments, the user may depress button 1208 in order to submit the communication to the recipient.

Device 1200 may include feature 1210. Feature 1210 may be configured to collect biometric data associated with a user of device 1200. Feature 1210 may include a camera. Feature 1210 may include a retinal scanner. Feature 1210 may include an iris scanner. Feature 1210 may include a microphone. The microphone may be used to record the communication. Device 1200 may include software and/or hardware configured to transcribe the communication for display in window 1204.

Device 1200 may include indicators 1212. Indicators 1212 may include LEDs. Indicators 1212 may be configured to indicate one or more than one stage of biometric data processing. Indicators 1212 may indicate readiness to collect the data. Indicators 1212 may indicate ongoing collection of the data. Indicators 1212 may indicate ongoing authentication of the data. Indicators 1212 may indicate successful authentication of the data. Indicators 1212 may indicate failed authentication of the data.

Device 1200 may include biometric data collecting feature 1214. Feature 1214 may be configured to collect biometric data associated with the user of device 1200. Feature 1214 may include a fingerprint scanner.

Device 1200 may include keyboard 1216. Keyboard 1216 may be configured to enable the user to compose the communication. Keyboard 1216 may include one or more depressible buttons. Keyboard 1216 may include one or more virtual buttons. GUI 1201 may include some or all parts of keyboard 1216. Keyboard 1216 may be configured to collect biometric data associated with the user of device 1200. Keyboard 1214 may include a fingerprint scanner. Successful input and/or authentication of identifying data submitted via one or more of feature(s) 1206, feature(s) 1210, feature(s) 1214 and keyboard 1216 may enable transmittal of the communication. The transmittal may include delivery of the communication to the recipient.

Figure 13:
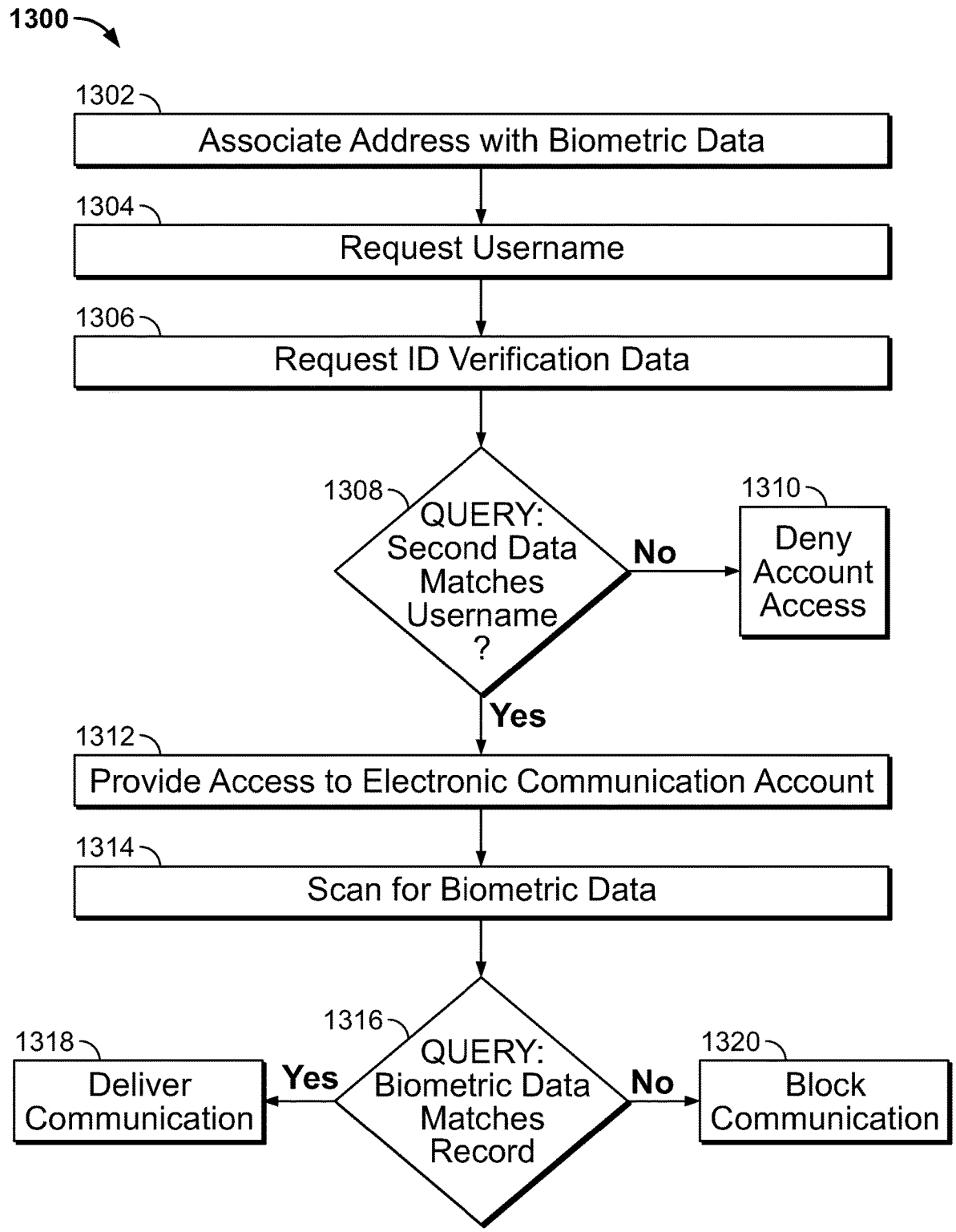
FIG. 13 is an illustrative flow diagram in accordance with principles of the invention.

FIG. 13 shows illustrative authentication process 1300. Process 1300 may include and/or involve one, some or all steps of one, some or all of process 200 (shown in FIG. 2), process 300 (shown in FIG. 3), process 400 (shown in FIG. 4), process 500 (shown in FIG. 5), process 700 (shown in FIG. 7), process 800 (shown in FIG. 8), process 900 (shown in FIG. 9), process 1000 (shown in FIG. 10) and/or process 1100 (shown in FIG. 11). One, some or all of steps of process 1300 may be enabled by a system (such as system 100 shown in FIG. 1). One, some or all of steps of process 1300 may be enabled by an electronic communication device, such as device 1200 (shown in FIG. 12). One, some or all of steps of process 1300 may be enabled by user interface, such as GUI 600 (shown in FIG. 6) and/or GUI 1201 (shown in FIG. 12). Process 1300 may begin at step 1302.

At step 1302, one or more than one electronic communication address, such as an email address, may be associated with biometric data. The address may include an address of a sender. The address may include an address of a recipient. In some embodiments, the association between the address and the biometric data may be performed during registration of the address into a whitelist. In some embodiments, the biometric data may be associated with both a sender address and a recipient address.

At step 1304, a username may be requested. The request may be mediated by a graphic user interface (GUI). The GUI may be presented upon access by a user of a site, such as a website.

At step 1306, identifying information may be requested from the user. The request may be presented by the GUI. The request may be presented by a second GUI.

At step 1308, the submitted username and the identifying information may be analyzed for a preestablished association, for example, in the whitelist. The whitelist may include a list of paired username(s) and identity data. The analysis may involve checking if the submitted username matches the submitted identifying information based on a whitelist pairing.

At step 1310, if the identifying information fails to match the username, access to an electronic communication account, such as an email account, associated with the username may be denied.

At step 1312, if the identifying information matches the username according to the preestablished association, access to the account may be provided. The access may be mediated by a third GUI, such as GUI 600 (shown in FIG. 6) or GUI 1201 (shown in FIG. 12). The GUI may include features, such as windows, for drafting a communication. The features may facilitate submission of an identifier of one or more than one designated recipient.

At step 1314, biometric data may be requested of the user. The request may be mediated by the third GUI. The third GUI may include features enabling submission of the biometric data, such as features 1210, 1214 and 1216 (shown in FIG. 12).

At step 1316, the submitted biometric data may be analyzed. The analysis may evaluate if the submitted data matches the biometric data associated with the address. For example, if the submitted data includes a set of one or more sequences of encoded biometric information, the analysis may determine if the submitted sequences include a minimum threshold of patterns matching stored encoded biometric data sequence(s) associated with one or more of the sender and/or recipient addresses. The analysis may be automated, such as by an automated transmitter and/or receiver. The analysis may include and/or involve machine-learning algorithms.

At step 1318, if the submitted data matches the biometric data associated with the address, the communication may be delivered to the recipient.

At step 1320, if the submitted data does not match the biometric data associated with the address, the communication may be blocked from delivery to the recipient.

Thus, systems and methods have been provided for efficiently determining which emails pose a threat and which are benign; for filtering malicious emails from non-malicious emails; for preventing receipt of bulk unsolicited and/or otherwise undesirable communications; and for authenticating an identity of a sender of an electronic communication. Persons skilled in the art will appreciate that the present invention can be practiced by other than the described embodiments, which are presented for purposes of illustration rather than of limitation. The present invention is limited only by the claims that follow.

What is claimed is:

1. A method for authenticating electronic communications, the method comprising:

generating a whitelist database in association with at least one account of at least one recipient, the whitelist database including at least one identifying reference to a whitelist correspondent, the generating of the whitelist database including:
  receiving from the whitelist correspondent registration data comprising:
    identification of a first penalty;
    an authorization to impose the first penalty; and
    identifying information; and
  in response to the receiving the registration data, cataloging into the whitelist database, and in association with the identifying reference, identification data associated with:
    a whitelist correspondent device associated with the whitelist correspondent; and
    a whitelist correspondent address associated with the whitelist correspondent;
generating a blacklist database in association with the account, the blacklist database including at least one blacklist correspondent address, the generating of the blacklist database including:
  identifying a property of the blacklist correspondent address, the property indicating that a communication originating from the blacklist correspondent address is unsolicited and malicious; and
  in response to the identifying, cataloging identification data associated with the blacklist correspondent address into the blacklist database;
receiving an electronic communication submitted by a sender for delivery to the recipient;
analyzing the content of the electronic communication for presence of identification data;
upon determination that the electronic communication includes a minimum threshold of the identification data cataloged in the whitelist database, delivering the communication to the recipient;
upon determination that the communication includes the identification data cataloged in the blacklist database, blocking delivery of the communication; and
upon determination that the communication lacks the identification data cataloged in the blacklist database, and further lacks the minimum threshold:
  prompting the sender to submit supplementary data, the supplementary data comprising:
    identification of a second penalty;
    an authorization to impose the second penalty; and
    additional identifying information; and
  delivering the communication to the recipient only after:
    receipt of the second penalty; and
    determining correspondence of the additional identifying information to the identification data associated with a whitelist correspondent;
  wherein the second penalty is selected from a plurality of second penalties based at least in part on frequency of electronic communications from the sender to the recipient.

2. The method of claim 1 further comprising generating a pin for use by the whitelist sender in an electronic communication for sending to the recipient.

3. The method of claim 1 further comprising:
  generating a blocked communication log;
  in response to the blocking, creating an entry in the log, the entry including data corresponding to the communication;
  submitting the log to at least one of:
    the recipient; and
    an entity responsible for reviewing and calibrating the authenticating.

4. A method for authenticating electronic communications, the method comprising:
  associating a correspondent address with a first set of identity verification data;
  presenting a sender with a request for a username;
  presenting the sender with a request for a second set of identity verification data;
  upon determination of a pre-established association between the username and the second set of identity verification data, presenting the sender with access to an electronic communication account, the access including features for composing the communication, the electronic communication account configured to collect one or more personal behavioral signatures from the sender at a plurality of distributed time points during composition of the electronic communication;
  upon initiation of an attempt by the sender to transmit the communication to the recipient, presenting the sender with a request for the first set of identity verification data; and
  upon presentation by the sender of the first set of identity verification data and confirmation of the collected personal behavioral signatures, transmitting the communication to the recipient.

5. The method of claim 4 wherein;
the first set of identity verification data and the second set of identity verification data comprise:
  a password;
  a personal identification number;
  biometric information; and
  geographic information; and
the personal behavioral identifiers collected from the sender during composition comprise:
  eye movement trajectory data;
  keystroke dynamics; and
  mouse use characteristics.

6. The method of claim 1, wherein the identifying information comprises one or morer personal bahavioral signatures associated with the whitelist correspondent.

7. The method of claim 1, wherein a sender device comprises a data reader configured to collect identifying information from the sender at a plurality of distributed time points during composition of the electronic communication.

8. The method of claim 1, wherein the electronic communication comprises one or more embedded personal behavioral signatures associated with the sender and gathered during composition of the electronic communication.

9. The method of claim 1, wherein the electronic communication comprises one or more embedded device features associated with a sender device.

* * * * *